(12) United States Patent
Mittal et al.

(10) Patent No.: US 11,895,025 B2
(45) Date of Patent: *Feb. 6, 2024

(54) METHOD AND SYSTEM FOR PROPAGATING NETWORK TRAFFIC FLOWS BETWEEN END POINTS BASED ON SERVICE AND PRIORITY POLICIES

(71) Applicant: Arista Networks, Inc., Santa Clara, CA (US)

(72) Inventors: Anuraag Mittal, Santa Clara, CA (US); Arup Raton Roy, Burnaby (CA); Thejesh Panchappa, Santa Clara, CA (US); Nitin Karkhanis, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,461

(22) Filed: Aug. 31, 2022

(65) Prior Publication Data

US 2023/0073630 A1 Mar. 9, 2023

Related U.S. Application Data

(63) Continuation of application No. 17/160,458, filed on Jan. 28, 2021, now Pat. No. 11,463,357, which is a continuation of application No. 16/142,091, filed on Sep. 26, 2018, now Pat. No. 10,917,342.

(51) Int. Cl.
*H04L 45/74* (2022.01)
*H04L 45/00* (2022.01)

(52) U.S. Cl.
CPC .............. *H04L 45/74* (2013.01); *H04L 45/22* (2013.01); *H04L 45/66* (2013.01)

(58) Field of Classification Search
CPC ............................... H04L 45/74; H04L 45/22
USPC ....................................................... 370/392
See application file for complete search history.

(56) References Cited

U.S. PATENT DOCUMENTS

2012/0177039 A1* 7/2012 Berman .................. H04L 41/12
370/428
2021/0152473 A1* 5/2021 Mittal ..................... H04L 45/74

* cited by examiner

*Primary Examiner* — Angel T Brockman
(74) *Attorney, Agent, or Firm* — Sprinkle IP Law Group

(57) ABSTRACT

A method and system for propagating network traffic flows between end points based on service and priority policies. Specifically, the method and system disclosed herein entail configuring network elements with network-disseminated traffic management policies. Each traffic management policy guides the handling of a network traffic flow between origination and termination end points (i.e., source and destination hosts), which may be defined through data link layer, network layer, and/or transport layer header information, as well as group assignment information, associated with the source and destination hosts.

20 Claims, 17 Drawing Sheets

METHOD AND SYSTEM FOR PROPAGATING NETWORK TRAFFIC FLOWS BETWEEN END POINTS BASED ON SERVICE AND PRIORITY POLICIES

RELATED APPLICATIONS

This application is a continuation of, and claims a benefit of priority under 35 U.S.C. 120 of, U.S. patent application Ser. No. 17/160,458 filed Jan. 28, 2021, entitled "Method and System for Propagating Network Traffic Flows Between End Points Based on Service and Priority Policies," issued as U.S. Pat. No. 11,463,357, which is a continuation of, and claims a benefit of priority under 35 U.S.C. 120 of, U.S. patent application Ser. No. 16/142,091 filed Sep. 26, 2018, entitled "Method and System for Propagating Network Traffic Flows Between End Points Based on Service and Priority Policies," issued as U.S. Pat. No. 10,917,342, which are hereby incorporated herein for all purposes.

BACKGROUND

Typically, the placement of a service device in the network traffic path between end points is determined at the time of network design. However, through the automation of this process, by retrieving service policies and instrumenting a forwarding mechanism, applications and hosts may be deployed independent of security constraints.

SUMMARY

In general, in one aspect, the invention relates to a method for processing network traffic. The method includes receiving a first media access control (MAC) frame at a first incoming network interface (INI), making a first determination that the first INI is an edge port, examining, based on the first determination, the first MAC frame to obtain a source data item and a destination data item, identifying a source group using the source data item and a destination group using the destination data item, obtaining a traffic flow instruction based at least on the source group and the destination group, and processing the first MAC frame in accordance with the traffic flow instruction.

In general, in one aspect, the invention relates to a network element. The network element includes a processor, a plurality of network interfaces including a first incoming network interface (INI), and a memory including instructions, which when executed by the processor, enables the network element to receive, from a source host and at the first INI, a first media access control (MAC) frame, make a first determination that the first INI is an edge port, examine, based on the first determination, the first MAC frame to obtain a source data item and a destination data item, identify a source group using the source data item and a destination group using the destination data item, obtain a traffic flow instruction based at least on the source group and the destination group, and process the first MAC frame in accordance with the traffic flow instruction.

In general, in one aspect, the invention relates to a non-transitory computer readable medium (CRM) including computer readable program code, which when executed by a computer processor, enables the computer processor to receive a first media access control (MAC) frame at a first incoming network interface (INI), make a first determination that the first INI is an edge port, examine, based on the first determination, the first MAC frame to obtain a source data item and a destination data item, identify a source group using the source data item and a destination group using the destination data item, obtain a traffic flow instruction based at least on the source group and the destination group, and process the first MAC frame in accordance with the traffic flow instruction.

Other aspects of the invention will be apparent from the following description and the appended claims.

DETAILED DESCRIPTION

Figure 1:
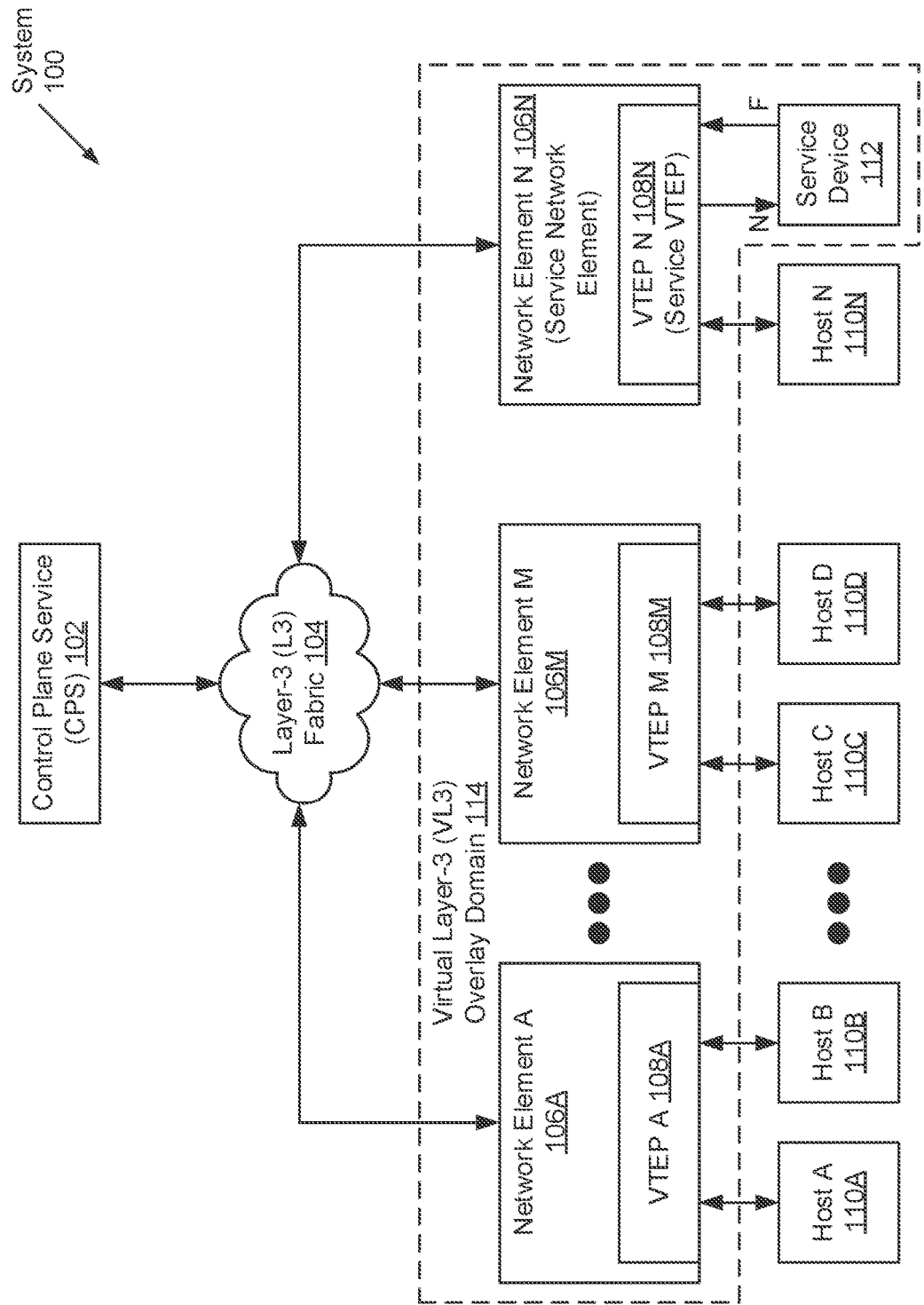
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for propagating network traffic flows between end points based on service and priority policies. Specifically, one or more embodiments of the invention entails configuring network elements with network-disseminated traffic management policies. Each traffic management policy guides the handling of a network traffic flow between origination and termination end points (i.e., source and destination hosts), which may be defined through data link layer, network layer, and/or transport layer header information, as well as group assignment information, associated with the source and destination hosts.

One or more embodiments of the invention hereinafter may be described in conjunction with the virtual extensible local area network (VXLAN) layer-3 (L3) encapsulation and tunneling protocol. However, one of ordinary skill will appreciate that the invention may be practiced using alternative virtual L3 (VL3) tunneling mechanisms. These other VL3 tunneling mechanisms may pertain to, for example, multi-protocol label switching (MPLS), generic routing encapsulation (GRE), and other existing or future developed tunneling mechanisms.

Further, one or more embodiments of the invention hereinafter may be described in conjunction with ternary content addressable memory (TCAM), which is used to perform high-speed, parallel lookups. However, one of ordinary skill will appreciate that the invention may be practiced using one or more alternative lookup data structures and/or objects, which separately or in combination, fulfill the same purpose of the TCAM described below.

FIG. 1 shows a system in accordance with one or more embodiments of the invention. The system (100) may include multiple network elements (106A-106N) operatively connected to one another and a control plane service (CPS) (102) through a layer-3 (L3) fabric (104). Further, each network element (106A-106N) may be directly-connected to one or more hosts (110A-110N). Moreover, the system (100) may include a service device (112), which may be directly-connected to at least one network element (106A-106N). Each of these components is described below.

In one embodiment of the invention, a network element (106A-106N) may be a physical device that includes persistent storage, memory (e.g., random access memory (RAM), shared memory, etc.), one or more computer processors (e.g., integrated circuits) (including a switch chip or network processor), and two or more physical network interfaces or ports. The computer processor(s) may be programmed to determine out of which network interface on the network element (106A-106N) to forward network traffic (e.g., media access control (MAC) frames). To that end, the computer processor(s) may include logical egress and ingress network interfaces that may connect to physical network interfaces on the network element (106A-106N). Further, each physical network interface may or may not be connected to another component (e.g., a host (110A-110N), another network element (106A-106N), a service device (112), or the L3 fabric (104)) in the system (100).

In one embodiment of the invention, a network element (106A-106N) may include functionality to receive network traffic via the network interfaces, and determine whether to: (i) drop the network traffic; (ii) process the network traffic in accordance with one or more embodiments of the invention; and/or (iii) send the network traffic, based on the processing, out another network interface on the network element (106A-106N) towards a destination.

How the network element (106A-106N) makes a determination of whether to drop network traffic (e.g., network packets), and/or send network traffic to another component in the system (100), depends, in part, on whether the network element (106A-106N) is a layer-2 (L2) switch or a L3 switch (also referred to as a multilayer switch), which may perform at least some functions of a router. If the network element (106A-106N) is operating as a L2 switch, the network element (106A-106N) uses the destination MAC address along with a forwarding table or policy to determine out of which network interface to send the network traffic. If the network element (106A-106N) is operating as a L3 switch, the network element (106A-106N) uses the destination Internet Protocol (IP) address along with a routing table or policy to determine out of which network interface to send the network traffic, and includes the ability to write the MAC address of the next hop (or component) to receive the network traffic in place of its own MAC address (which the last hop or component to send the network traffic wrote) in the L2 information encapsulating the network traffic. If the network element (106A-106N) is a multilayer switch, the network element (106A-106N) includes functionality to process network traffic using both MAC addresses and IP addresses.

In one embodiment of the invention, the persistent storage on a network element (106A-106N) may include any type of non-transitory computer readable medium that includes instructions, which when executed by the computer processor(s), enable the network element (106A-106N) to perform any of the functionalities described herein. Moreover, examples of a network element (106A-106N) include, but are not limited to, a switch, a router, and a multilayer switch. Further, a network element (106A-106N) is not limited to the aforementioned specific examples.

In one embodiment of the invention, each network element (106A-106N) may include a virtual tunnel end point (VTEP) (108A-108N). A VTEP (108A-108N) may refer to a logical intelligence (i.e., software) tasked with originating and/or terminating VL3 tunnels. Further, a VTEP (108A-108N) may include functionality to: (i) encapsulate MAC frames into VL3 frames, where the MAC frames may be generated by or obtained from a directly-connected host (110A-110N), a virtual machine (VM) (not shown) executing on a directly-connected host (110A-110N), and a directly-connected service device (112); (ii) transmit VL3 frames towards remote VTEPs (108A-108N) executing on remote network elements (106A-106N) through the L3 fabric (104); (iii) receive other VL3 frames from these remote VTEPs (108A-108N) via the L3 fabric (104); and (iv) decapsulate (i.e., remove the VL3 frame header information from) these other VL3 frames to obtain other MAC frames therefrom, where these other MAC frames may have been generated by remote hosts (110A-110N), remote VMs (not shown) executing on remote hosts (110A-110N), and remote service devices (112). By way of an example, a VL3 frame may be a VXLAN frame, whereas the virtual tunnel through which VXLAN frames traverse may be a VXLAN tunnel. Embodiments of the invention are not limited to any specific implementation or protocol for generating VL3 frames and/or virtual tunnels.

In one embodiment of the invention, a service VTEP may be described herein. A service VTEP (e.g., VTEP N (108N)) may refer to a VTEP that executes on a network element (e.g., network element N (106N)) that is directly-connected to a service device (112). Further, in one embodiment of the invention, a service network element may also be described herein. A service network element (e.g., network element N (106N)) may refer to a network element that is directly-connected to a service device (112).

In one embodiment of the invention, a host (110A-110N) may be any computing system (e.g., implemented through software and computer hardware) that may be configured to generate, send, receive, and/or process requests and replies, either locally or over a network. A host (110A-110N) may include one or more computer processors, memory, and one or more physical network interfaces. Further, a host (110A-110N) may include functionality to generate, receive, and/or transmit network traffic (e.g., MAC frames). Examples of a host (110A-110N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a tablet computer, or any other mobile device), or any other type of computing device including the aforementioned minimum requirements.

In one embodiment of the invention, a control plane service (CPS) (102) may be a platform for the centralized management of and/or consolidation of state information for all or a portion of the network elements (106A-106N) in the system (100). A CPS (102) may be implemented on one or more physical or virtual devices, which includes at least one or more processors, memory, one or more physical network interfaces, and a data repository. In one embodiment of the invention, a CPS (102) may include executable instructions (stored in a non-transitory computer readable medium), which when executed, enable the CPS (102) to disseminate, to various VTEPs (108A-108N), information pertinent to embodiments of the invention disclosed herein (described below) (see e.g., FIGS. 3 and 4).

In one embodiment of the invention, a CPS (102) may include a data repository (not shown). The data repository may be a storage system or media for consolidating various forms of data. The data repository may be implemented across one or more physical and/or virtual storage units or devices, which may or may not be of the same type or co-located in a same computing device. Furthermore, the information consolidated in the data repository may be arranged using any storage mechanism (e.g., a filesystem, a database, a collection of tables, etc.). In one embodiment of the invention, the data repository may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, a service device (112) may be a physical or virtual computing device that includes functionality to provide a service to one or more network elements (106A-106N) and/or one or more hosts (110A-110N). A service device (112) may include at least one or more processors, memory, and two or more physical network interfaces. In one embodiment of the invention, a service device (112) may include functionality to process network traffic, redirected thereto from various VTEPs (106A-108N), in accordance with the configuration of, and the specific service thus provided by, the service device (112). Subsequently, a service device (112) may include functionality to filter, mirror, store, forward, drop, transform, and/or perform any other action, or any combination thereof, to redirected network traffic, which is afforded by the configuration and provided service of the service device (112). Examples of service devices (112) include, but are not limited to, network security devices (e.g., firewall devices and denial of service (DOS) attack scrubbers), network filtering devices (e.g., web content filters), network data caches (e.g., web-cache devices), and network load balancing devices. In one embodiment of the invention, a service device (112) may be reachable by (i.e., operatively connected to) any VTEP (108A-108N) in the system (100) through a virtual layer-3 (VL3) overlay domain (114). By way of an example, the VL3 overlay domain (114) may be a VXLAN overlay domain.

In one embodiment of the invention, the L3 fabric (104) may be a set of interconnected network elements or systems, which operatively connect one or more CPSs (102) to each of the network elements (106A-106N) of the system (100). The L3 fabric (110) may include functionality to facilitate communications between these aforementioned components. Accordingly, the L3 fabric (102) may include any combination of local area network (LAN) and/or wide area network (WAN) (e.g., Internet) segments, which may employ any combination of wired and/or wireless connections and communication protocols.

While FIG. 1 shows a configuration of components, other system configurations may be used without departing from the scope of the invention. For example, the system (100) may further include one or more virtual machines (not shown), which may execute on any underlying hardware component portrayed in the system (100).

Figure 2A:
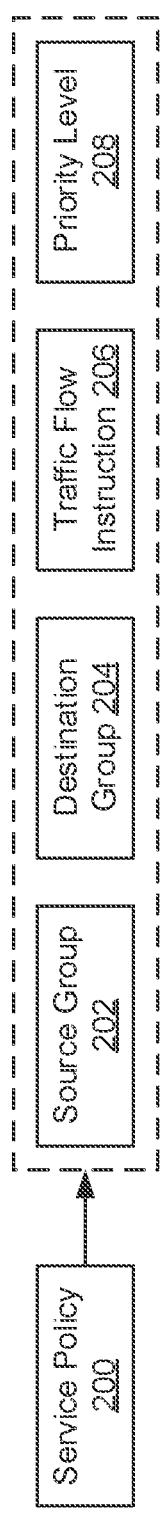
FIG. 2A shows a service policy in accordance with one or more embodiments of the invention.

FIG. 2A shows a service policy in accordance with one or more embodiments of the invention. A service policy (200) may be a traffic management rule for redirecting certain network traffic flows towards a service device on the network for inspection. The affected network traffic flows may be defined based on groups into which the network traffic flow origination and termination end points are classified.

Subsequently, a service policy (200) may specify a source group (202), a destination group (204), a traffic flow instruction (206), and a priority level (208). Each of these data items is described below.

In one embodiment of the invention, the source group (202) may refer to a classification assigned to the origination end point of a network traffic flow. The origination end point may be a physical or virtual source (e.g., a host, a virtual machine, etc.) of the network traffic flow. Further, the destination group (204) may refer to a classification assigned to the termination end point of the network traffic flow, where the termination end point may be a physical or virtual destination (e.g., a host, a virtual machine, etc.) for the network traffic flow. Both the source group (202) and the destination group (204) may be determined through lookups performed on one or more group tables (see e.g., FIGS. 2C and 2D). Moreover, the traffic flow instruction (206) may refer to one or more actions that may be applied to the network traffic flow defined in the service policy (200). By way of an example, the traffic flow instruction (206) may specify the interception of the network traffic flow and, subsequently, its redirection towards a service device for inspection. Lastly, the priority level (208) may be a numeric or categorical value representing the relative importance of the service policy (200). One of ordinary skill will appreciate that a service policy (200) may specify additional or alternative information without departing from the scope of the invention.

Figure 2B:
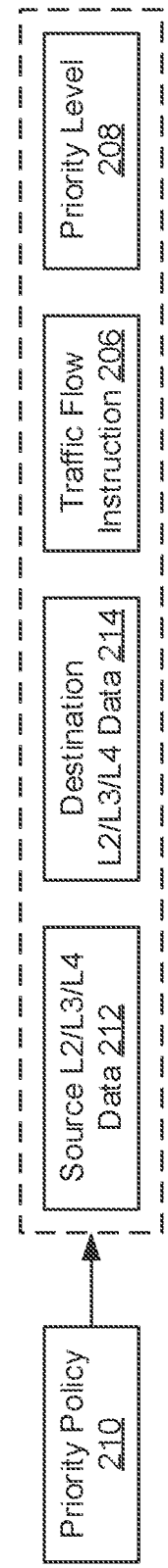
FIG. 2B shows a priority policy in accordance with one or more embodiments of the invention.

FIG. 2B shows a priority policy in accordance with one or more embodiments of the invention. A priority policy (210) may be a traffic management rule for handling certain, defined network traffic flows. A priority policy (210) may refer to a traffic management rule that may supersede any service policy (200) should the same network traffic flow be defined by both the priority policy (210) and the service policy (200). Network traffic flows impacted by a priority policy (210) may be defined based on layer-2 (L2), layer-3 (L3), and/or layer-4 (L4) information associated with the origination and termination end points of the network traffic flows. Subsequently, a priority policy (210) may specify source L2, L3, or L4 data (212), destination L2, L3, or L4 data (214), a traffic flow instruction (206), and a priority level (208). Each of these data items is described below.

In one embodiment of the invention, source L2, L3, or L4 data (212) may refer to data link layer, network layer, or transport layer, respectively, information associated with the origination end point of a network traffic flow. The origination end point may be a physical or virtual source (e.g., a host, a virtual machine, etc.) of the network traffic flow. Further, destination L2, L3, or L4 data (214) may refer to data link layer, network layer, or transport layer, respectively, information associated with the termination end point of the network traffic flow, where the termination end point may be a physical or virtual destination (e.g., a host, a virtual machine, etc.) for the network traffic flow. Examples of L2 information may include, but are not limited to, media access control (MAC) addresses and virtual local area network (VLAN) tagging information. Examples of L3 information may include, but are not limited to, Internet Protocol (IP) addresses, virtual routing and forwarding (VRF) domains, and L3 protocol (e.g., transport control protocol (TCP), user datagram protocol (UDP), etc.) information. Examples of L4 information may include, but are not limited to, network interface or port identifiers, and datagram length information.

Moreover, in one embodiment of the invention, the traffic flow instruction (206) may refer to one or more actions that may be applied to the network traffic flow defined in the priority policy (210). By way of an example, the traffic flow instruction (206) may specify the forwarding of the network traffic flow along a path that bypasses any service devices. By way of another example, the traffic flow instruction (206) may specify the dropping or discarding of network traffic (e.g., MAC frames) pertaining to the network traffic flow. Lastly, the priority level (208) may be a numeric or categorical value representing the relative importance of the priority policy (210). One of ordinary skill will appreciate that a priority policy (210) may specify additional or alternative information without departing from the scope of the invention.

Figure 2C:
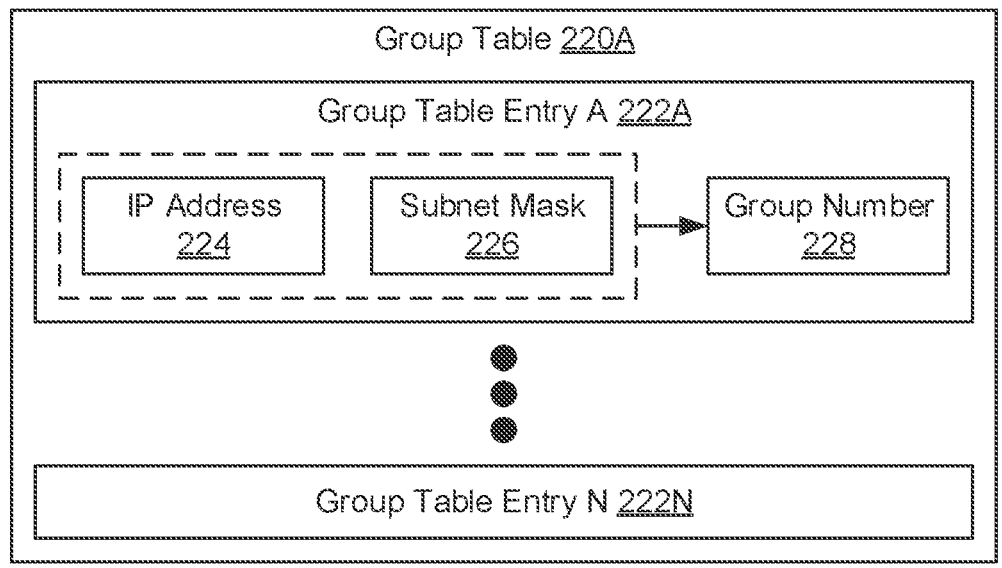
FIG. 2C shows a group table in accordance with one or more embodiments of the invention.

FIG. 2C shows a group table in accordance with one or more embodiments of the invention. The group table (220A) may refer to a data object or structure for storing bindings relating network layer (i.e., layer-3 (L3)) information to traffic flow group classifications. These bindings may be tracked in the form of one or more group table entries (222A-222N). Further, each group table entry (222A-222N) may specify an Internet Protocol (IP) address (224), a subnet mask (226), and a group number (228). Each of these data items is described below.

In one embodiment of the invention, the IP address (224) may represent a logical numeric address assigned to uniquely identify and locate a device (e.g., a host, a network element, a service device, etc.) on an IP-enabled network. The subnet mask (226) may refer to a bitmask that may be overlaid over the IP address (224) to identify to which subnetwork (or range of IP addresses on a same network) the device belongs. Together, the IP address (224) and the subnet mask (226) yield a network prefix (not shown). Lastly, the group number (228) may refer to a numerical or categorical value representative of a group of IP addresses. The group of IP addresses may include one or more arbitrary IP addresses or, alternatively, one or more IP addresses that may belong to a same subnetwork. Moreover, in one embodiment of the invention, the group table (220A) may reside on any network element and control plane service (CPS); and may be programmed by network administrators.

While FIG. 2C shows a configuration of data items (i.e., IP address (224) and subnet mask (226)), which map to group numbers (228), other data item configurations, including additional or alternative data items that map to group numbers (228), may be used without departing from the scope of the invention.

Figure 2D:
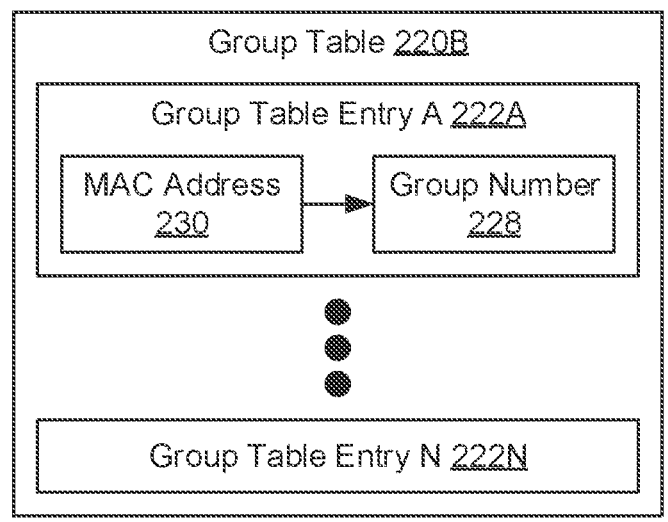
FIG. 2D shows a group table in accordance with one or more embodiments of the invention.

FIG. 2D shows a group table in accordance with one or more embodiments of the invention. The group table (220B) may refer to a data object or structure for storing bindings relating data link layer (i.e., layer-2 (L2)) information to traffic flow group classifications. These bindings may be tracked in the form of one or more group table entries (222A-222N). Further, each group table entry (222A-222N) may specify a media control access (MAC) address (230) and a group number (228). Each of these data items is described below.

In one embodiment of the invention, the MAC address (230) may represent a logical numeric address assigned to uniquely identify a network hardware interface (e.g., the network interface controller (NIC)) of a device (e.g., a host, a network element, a service device, etc.) for communications at the data link layer of a network. The group number (228), on the other hand, may refer to a numerical or categorical value representative of a group of MAC addresses. The group of MAC addresses may include one or more arbitrary MAC addresses. Moreover, in one embodiment of the invention, the group table (220B) may reside on any network element and control plane service (CPS); and may be programmed by network administrators.

While FIG. 2D shows a configuration of data items (i.e., MAC address (230)), which map to group numbers (228), other data item configurations, including additional or alternative data items that map to group numbers (228), may be used without departing from the scope of the invention.

Figure 2E:
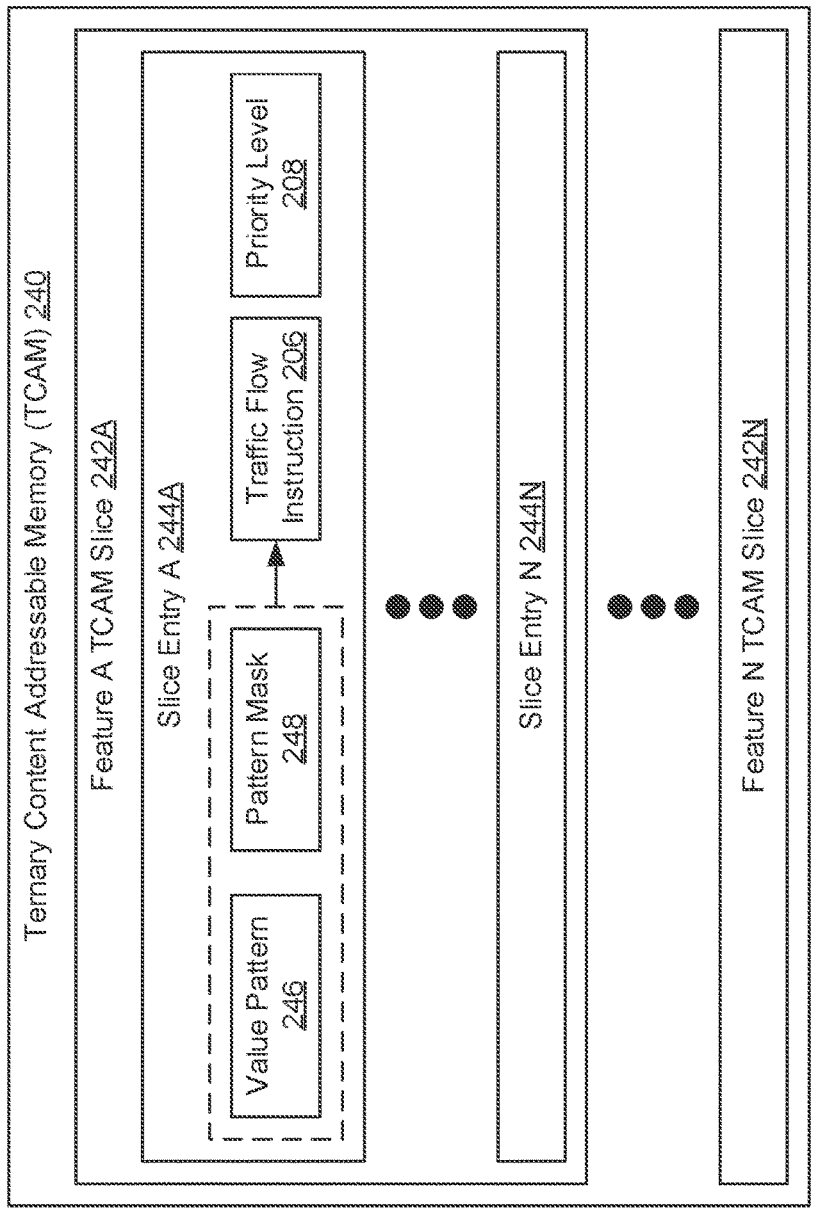
FIG. 2E shows a ternary content addressable memory in accordance with one or more embodiments of the invention.

FIG. 2E shows a ternary content addressable memory (TCAM) in accordance with one or more embodiments of the invention. The TCAM (240) may refer to specialized computer memory used for high-speed, parallel lookup applications. The TCAM (240) may be logically partitioned into one or more feature TCAM slices (242A-242N). Each feature TCAM slice (242A-242N) reserves a subset of the TCAM (240) for the allocation of bindings significant to a particular feature configured onto a network element, where each binding may result from the installment of a service policy (see e.g., FIG. 2A), a priority policy (see e.g., FIG. 2B), or any other policy onto the network element. Examples of features for which partitions of the TCAM (240) may be reserved include, but are not limited to, access control lists (ACLs), quality of service (QoS), control plane policing (CoPP), Internet Protocol version 4 (IPv4), IP version 6 (IPv6), etc.

In one embodiment of the invention, each feature TCAM slice (242A-242N) may further be logically partitioned into one or more slice entries (244A-244N). Each slice entry (244A-244N), as mentioned above, may store information pertinent to a service policy, a priority policy, or any other policy. Specifically, in one embodiment of the invention, each slice entry (244A-244N) may specify a value pattern (246), a pattern mask (248), a traffic flow instruction (206), and a priority level (208). Each of these data items is described below.

In one embodiment of the invention, the value pattern (246) may refer to a sequence or pattern of bits formed from the concatenation of various binary-formatted pieces of information (i.e., data items). The value pattern (246) is described in further detail below with respect to FIG. 2F. The pattern mask (248), on the other hand, may refer to a bitmask expressed in the same binary format and bit order as the value pattern (246), which highlights the value pattern bits of interest or significance. Collectively, the value pattern (246) and the pattern mask (248) represent information to be matched, associated with a network traffic flow, in order to perform one or more actions, defined by a policy, to the network traffic flow.

Moreover, in one embodiment of the invention, the traffic flow instruction (206) may refer to one or more actions that may be applied to a network traffic flow associated with information (i.e., one or more data items) that matches the value pattern (246), overlaid with the pattern mask (248), of the slice entry (244A-244N). By way of examples, the traffic flow instruction (206) may specify: (a) a redirecting action, which may entail the interception and subsequent redirection of the network traffic flow to a service device for inspection; (b) a bypassing action, which may entail the forwarding of the network traffic flow along a path that bypasses any service devices; and (c) a discarding action, which may entail the dropping of the network traffic flow. Lastly, the priority level (208) may be a numeric or categorical value representing the relative importance of the priority policy (210). In one embodiment of the invention, the traffic flow instruction (206) and the priority level (208) may collectively be disclosed herein as a TCAM result (not shown). One of ordinary skill will appreciate that each slice entry (244A-244N) may specify additional or alternative information without departing from the scope of the invention.

Figure 2F:
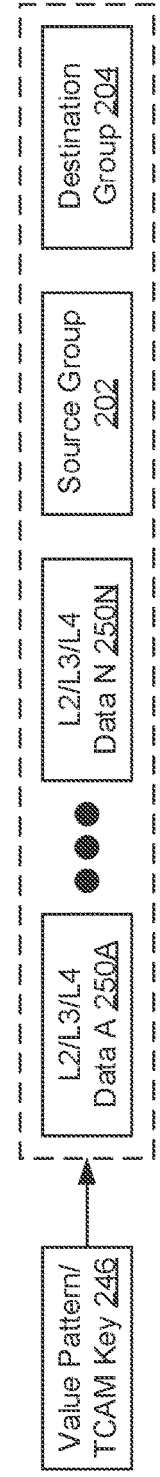
FIG. 2F shows a value pattern in accordance with one or more embodiments of the invention.

FIG. 2F shows a value pattern in accordance with one or more embodiments of the invention. As described above, a value pattern (246) may refer to a sequence or pattern of bits formed from the concatenation of various binary-formatted pieces of information (i.e., data items). Further, these data items may include any combination of one or more source L2, L3, and/or L4 data (250A-250N), one or more destination L2, L3, and/or L4 data (250A-250N), a source group (202), and a destination group (204). Also, though the value pattern (246) portrayed in FIG. 2F is presented in a particular order (i.e., one or more L2, L3, and/or L4 data items (250A-250N) first, followed by the source group (202) and destination group (204)), one of ordinary skill will appreciate that the combination of data items selected to represent the value pattern (246) may be ordered in any other arrangement without departing from the scope of the invention. In one embodiment of the invention, the sequence or pattern of bits used to perform lookups of the TCAM (240) may be disclosed herein as a TCAM key, which may specify zero or more of the data items representative of a value pattern (246). A TCAM result (i.e., a traffic flow instruction (206) and a priority level (208)) may be identified based on a matching of the TCAM key, overlaid with a pattern mask (248), to a value pattern (246), corresponding to the pattern mask (248), overlaid with the pattern mask (248).

Figures 2G, 2H:
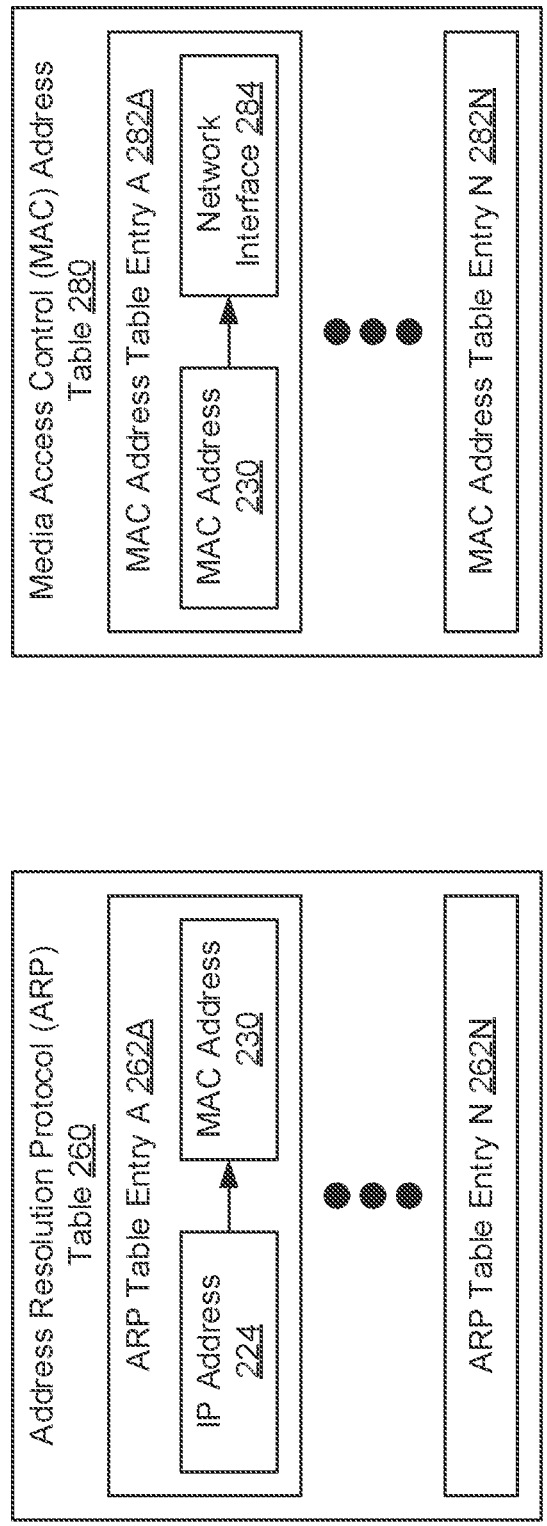
FIG. 2G shows an address resolution protocol table in accordance with one or more embodiments of the invention.
FIG. 2H shows a media access control address table in accordance with one or more embodiments of the invention.

FIG. 2G shows an address resolution protocol (ARP) table in accordance with one or more embodiments of the invention. The ARP table (260) may refer to a data object or structure for storing bindings relating network layer (i.e., layer-3 (L3)) information to data link layer (i.e., layer-2 (L2)) information. These bindings may be tracked in the form of one or more ARP table entries (262A-262N). Further, each ARP table entry (262A-262N) may specify an Internet Protocol (IP) address (224) and a media access control (MAC) address (230). Each of these data items is described below.

In one embodiment of the invention, the IP address (224) may represent a logical numeric address assigned to uniquely identify and locate a device (e.g., a host, a network element, a service device, etc.) on an IP-enabled network. The MAC address (230), on the other hand, may represent a logical numeric address assigned to uniquely identify a network hardware interface (e.g., the network interface controller (NIC)) of the device for communications at the data link layer of the network. Subsequently, the IP address (224) and the MAC address (230), specified in an ARP table entry (262A-262N), may be associated with a same device. Moreover, in one embodiment of the invention, the ARP table (260) may reside on any network element and control plane service (CPS); and may be programmed by one or more processes executing thereon.

While FIG. 2F shows a configuration of data items (i.e., IP address (224)), which map to MAC addresses (230), other data item configurations, including additional or alternative data items that map to MAC addresses(230), may be used without departing from the scope of the invention.

FIG. 2H shows a media access control (MAC) address table in accordance with one or more embodiments of the invention. The MAC address table (280) may refer to a data object or structure for storing bindings relating data link layer (i.e., layer-2 (L2)) information to transport layer (i.e., layer-4 (L4)) information. These bindings may be tracked in the form of one or more MAC address table entries (282A-282N). Further, each MAC address table entry (282A-282N)

may specify a MAC address (230) and a network interface (284). Each of these data items is described below.

While FIG. 2H shows a configuration of data items (i.e., MAC address (230)), which map to network interfaces (284), other data item configurations, including additional or alternative data items that map to network interfaces (284), may be used without departing from the scope of the invention.

In one embodiment of the invention, the MAC address (230) may represent a logical numeric address assigned to uniquely identify a network hardware interface (e.g., the network interface controller (NIC)) of a remote (or destination) device (e.g., a host, a network element, a service device, etc.) for communications at the data link layer of a network. The network interface (284), on the other hand, may refer to a unique identifier assigned to a physical or virtual port on a network hardware interface of a local (or source) device. Moreover, in one embodiment of the invention, the MAC address table (280) may reside on any network element and control plane service (CPS); and may be programmed by one or more processes executing thereon.

Figure 3:
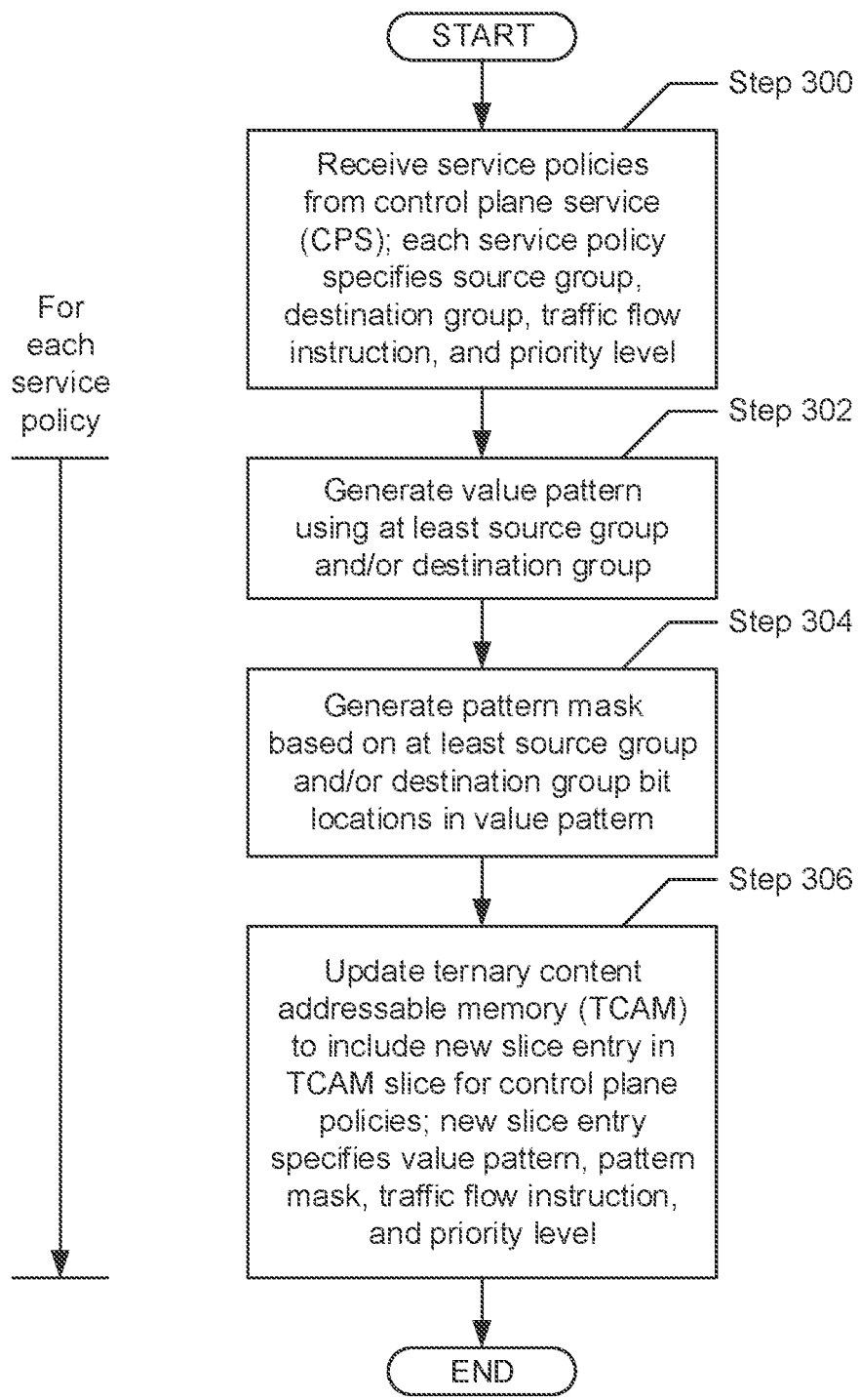
FIG. 3 shows a flowchart describing a method for installing service policies in accordance with one or more embodiments of the invention.

FIG. 3 shows a flowchart describing a method for installing service policies in accordance with one or more embodiments of the invention. The various steps outlined below may be performed by any network element or a virtual tunnel end point (VTEP) that may be executing on the network element. Further, while the various steps in the flowcharts are presented and described sequentially, one of ordinary skill will appreciate that some or all steps may be executed in different orders, may be combined or omitted, and some or all steps may be executed in parallel.

Turning to FIG. 3, in Step 300, one or more service policies are received from a control plane service (CPS) (see e.g., FIG. 1). In one embodiment of the invention, each service policy may be a traffic management rule for redirecting certain network traffic flows towards a service device on the network for inspection. Further, each service policy may specify a source group, a destination group, a traffic flow instruction, and a priority level. Each of these data items is described in further detail above with respect to FIG. 2A.

Steps 302 through 306, hereinafter, may form an iteration of instructions that may be performed for each service policy of the one or more service policies (received in Step 300). Subsequently, in Step 302, a value pattern is generated using at least the source group and/or the destination group. In one embodiment of the invention, the value pattern may refer to a sequence or pattern of bits formed from the concatenation of various binary-formatted pieces of information (i.e., data items) including the source group and/or the destination group. The value pattern is described in further detail above with respect to FIG. 2F.

In Step 304, a pattern mask is generated at least based on a subset of bit locations, in the value pattern (generated in Step 302), at which the source group and/or the destination group are positioned. In one embodiment of the invention, the pattern mask represents a bitmask expressed in the same binary format and bit order as the value pattern, which highlights the value pattern bits of interest or significance. Specifically, in the instant case, all bits at bit locations designated for at least the source group and/or the destination group may be set (i.e., defined as binary value one) while the remaining bits, representative of other data items, may be left clear (i.e., defined as binary value zero).

Consider the following simplified example: assume the value pattern is six bits long—i.e., thus including, from left to right: a first bit at the first bit location, a second bit at the second bit location, a third bit at the third bit location, a fourth bit at the fourth bit location, a fifth bit at the fifth bit location, and a sixth bit at the sixth bit location. Further, assume that the data items concatenated together to form the value pattern are, in the aforementioned recited bit order: (i) the source Internet Protocol (IP) address associated with a source host; (ii) a destination IP address associated with a destination host; (iii) a source media access control (MAC) address associated with the source host; (iv) a destination MAC address associated with the destination host; (v) the source group number; and (vi) the destination group number. Subsequently, the pattern mask generated to highlight at least the source group and/or the destination group as the bits of interest would be [000011], where the fifth and sixth bit locations—representing the source and destination groups—are set while the remaining bit locations are left clear. One of ordinary skill will appreciate that the above example is for explanatory purposes only and not intended to limit the scope of the invention.

In Step 306, a ternary content addressable memory (TCAM) is updated to incorporate the service policy. Specifically, in one embodiment of the invention, the TCAM may be updated to include (i.e., allocate memory for consolidating) a new slice entry in the feature TCAM slice (see e.g., FIG. 2E) designated for control plane policies. Further, the new slice entry may recite a binding relating the value pattern (generated in Step 302) and the pattern mask (generated in Step 304) to a TCAM result, where the TCAM result specifies the traffic flow instruction and the priority level (received by way of the service policy in Step 300).

Figure 4:
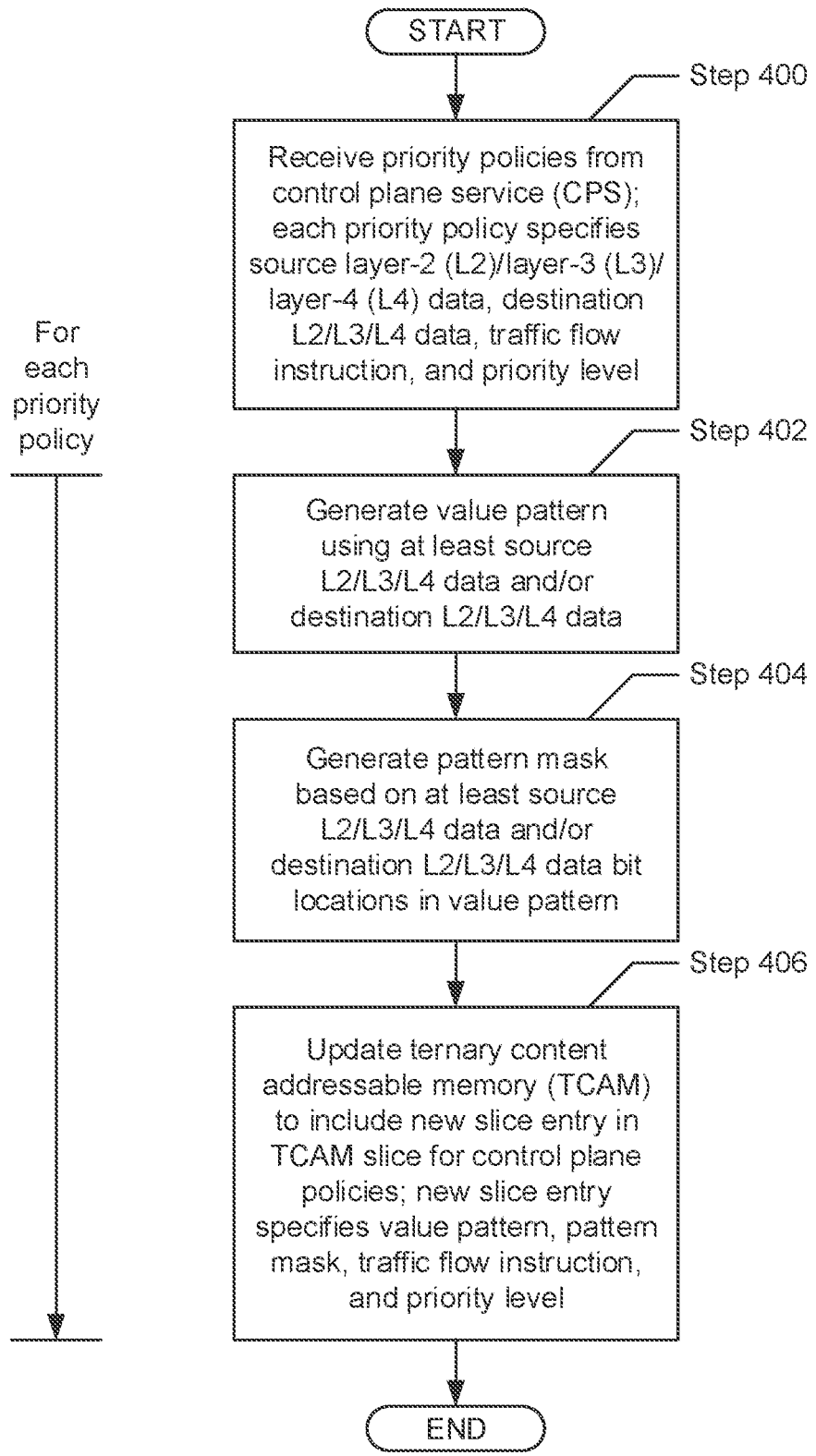
FIG. 4 shows a flowchart describing a method for installing priority policies in accordance with one or more embodiments of the invention.

FIG. 4 shows a flowchart describing a method for installing priority policies in accordance with one or more embodiments of the invention. The various steps outlined below may be performed by any network element or a virtual tunnel end point (VTEP) that may be executing on the network element. Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, one or more priority policies are received from a control plane service (CPS) (see e.g., FIG. 1). In one embodiment of the invention, each priority policy may be a traffic management rule for handling certain, defined network traffic flows. Further, each priority policy may specify source layer-2 (L2), layer-3 (L3), or layer-4 (L4) data, destination L2, L3, or L4 data, a traffic flow instruction, and a priority level. Each of these data items is described in further detail above with respect to FIG. 2B.

Steps 402 through 406, hereinafter, may form an iteration of instructions that may be performed for each priority policy of the one or more priority policies (received in Step 400). Subsequently, in Step 402, a value pattern is generated using at least the source L2, L3, or L4 data and/or the destination L2, L3, or L4 data. In one embodiment of the invention, the value pattern may refer to a sequence or pattern of bits formed from the concatenation of various binary-formatted pieces of information (i.e., data items) including the source L2, L3, or L4 data and/or the destination L2, L3, or L4. The value pattern is described in further detail above with respect to FIG. 2F.

In Step 404, a pattern mask is generated at least based on a subset of bit locations, in the value pattern (generated in Step 402), at which the source L2, L3, or L4 data and/or the destination L2, L3, or L4 data are positioned. In one embodiment of the invention, the pattern mask represents a bitmask expressed in the same binary format and bit order as the value pattern, which highlights the value pattern bits of interest or significance. Specifically, in the instant case, all bits at bit locations designated for at least the source L2, L3, or L4 data and/or the destination L2, L3, or L4 data may be set (i.e., defined as binary value one) while the remaining bits, representative of other data items, may be left clear (i.e., defined as binary value zero).

Consider the following simplified example: assume the value pattern is six bits long—i.e., thus including, from left to right: a first bit at the first bit location, a second bit at the second bit location, a third bit at the third bit location, a fourth bit at the fourth bit location, a fifth bit at the fifth bit location, and a sixth bit at the sixth bit location. Further, assume that the data items concatenated together to form the value pattern are, in the aforementioned recited bit order: (i) the source Internet Protocol (IP) address associated with a source host (i.e., a source L3 data item); (ii) a destination IP address associated with a destination host (i.e., a destination L3 data item); (iii) a source media access control (MAC) address associated with the source host (i.e., a source L2 data item); (iv) a destination MAC address associated with the destination host (i.e., a destination L2 data item); (v) the source group number; and (vi) the destination group number. Subsequently, the pattern mask generated to highlight at least the source L2 data item and/or the destination L2 data item as the bits of interest would be [001100], where the third and fourth bit locations—representing the source and destination L2 data items (i.e., MAC addresses)—are set while the remaining bit locations are left clear. One of ordinary skill will appreciate that the above example is for explanatory purposes only and not intended to limit the scope of the invention.

In Step 406, a ternary content addressable memory (TCAM) is updated to incorporate the priority policy. Specifically, in one embodiment of the invention, the TCAM may be updated to include (i.e., allocate memory for consolidating) a new slice entry in the feature TCAM slice (see e.g., FIG. 2E) designated for control plane policies. Further, the new slice entry may recite a binding relating the value pattern (generated in Step 402) and the pattern mask (generated in Step 404) to a TCAM result, where the TCAM result specifies the traffic flow instruction and priority level (received by way of the priority policy in Step 400).

Figure 5A:
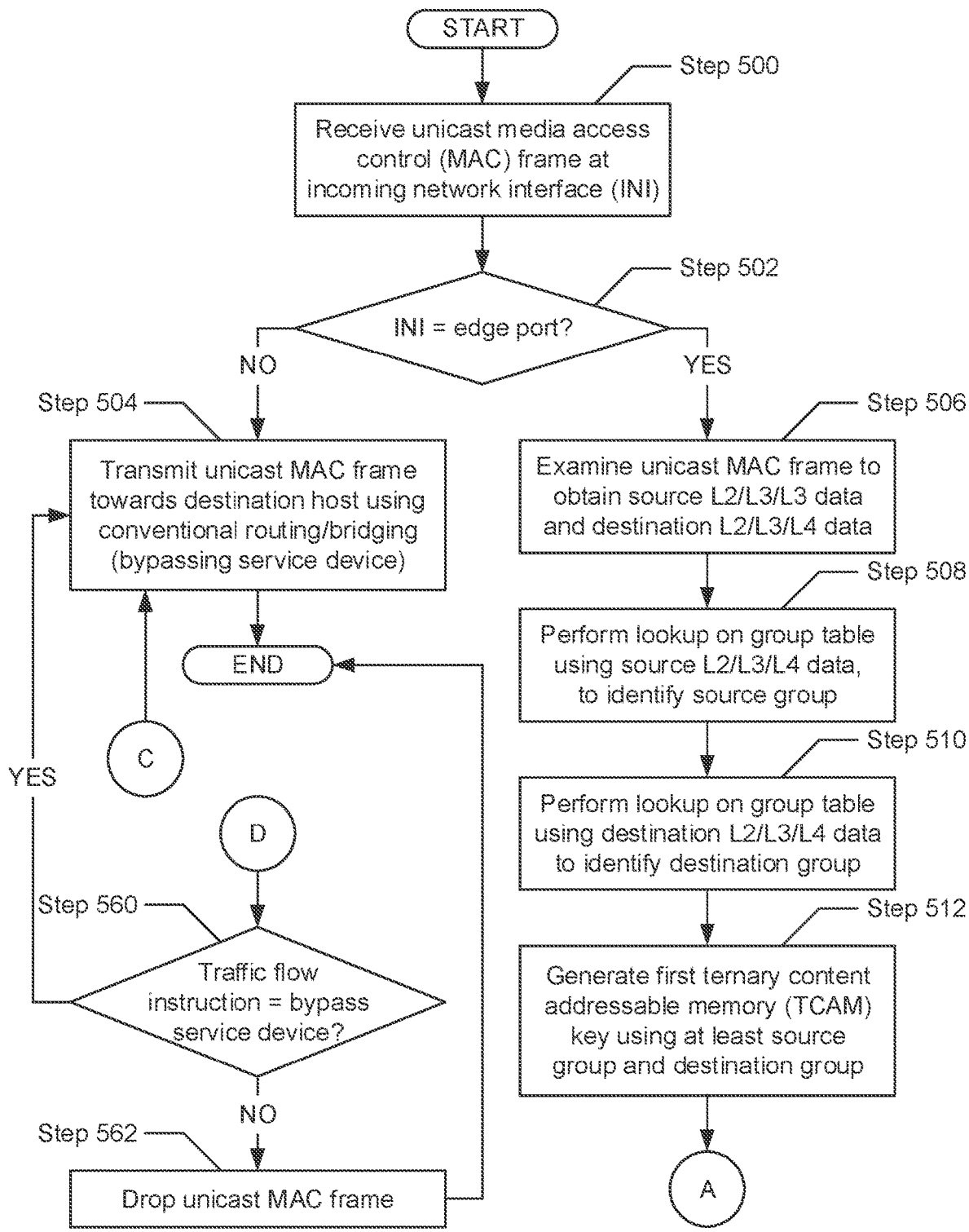
FIGS. 5A-5C show flowcharts describing a method for directing network traffic flow in accordance with one or more embodiments of the invention.
Figure 5B:
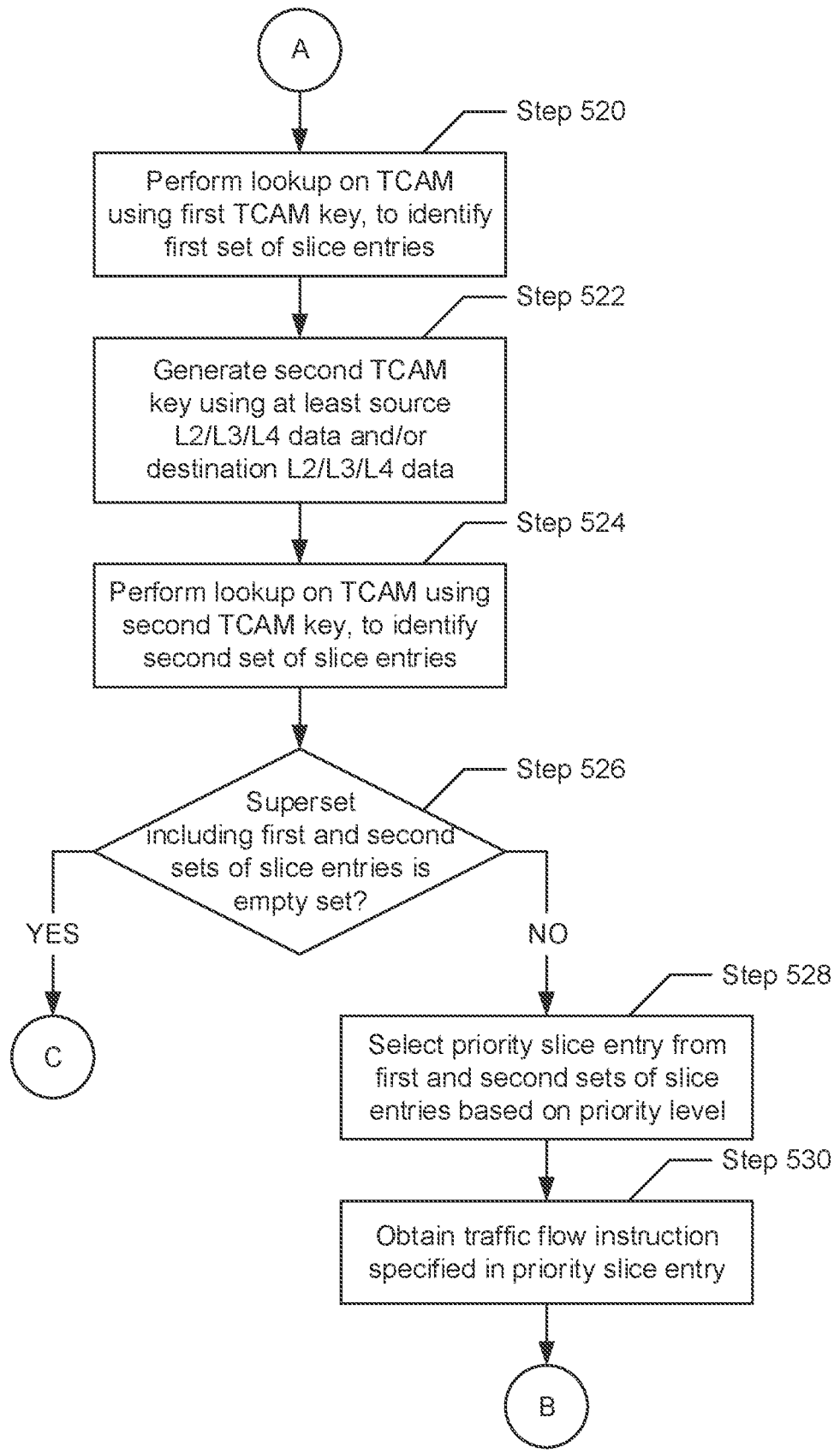
Figure 5C:
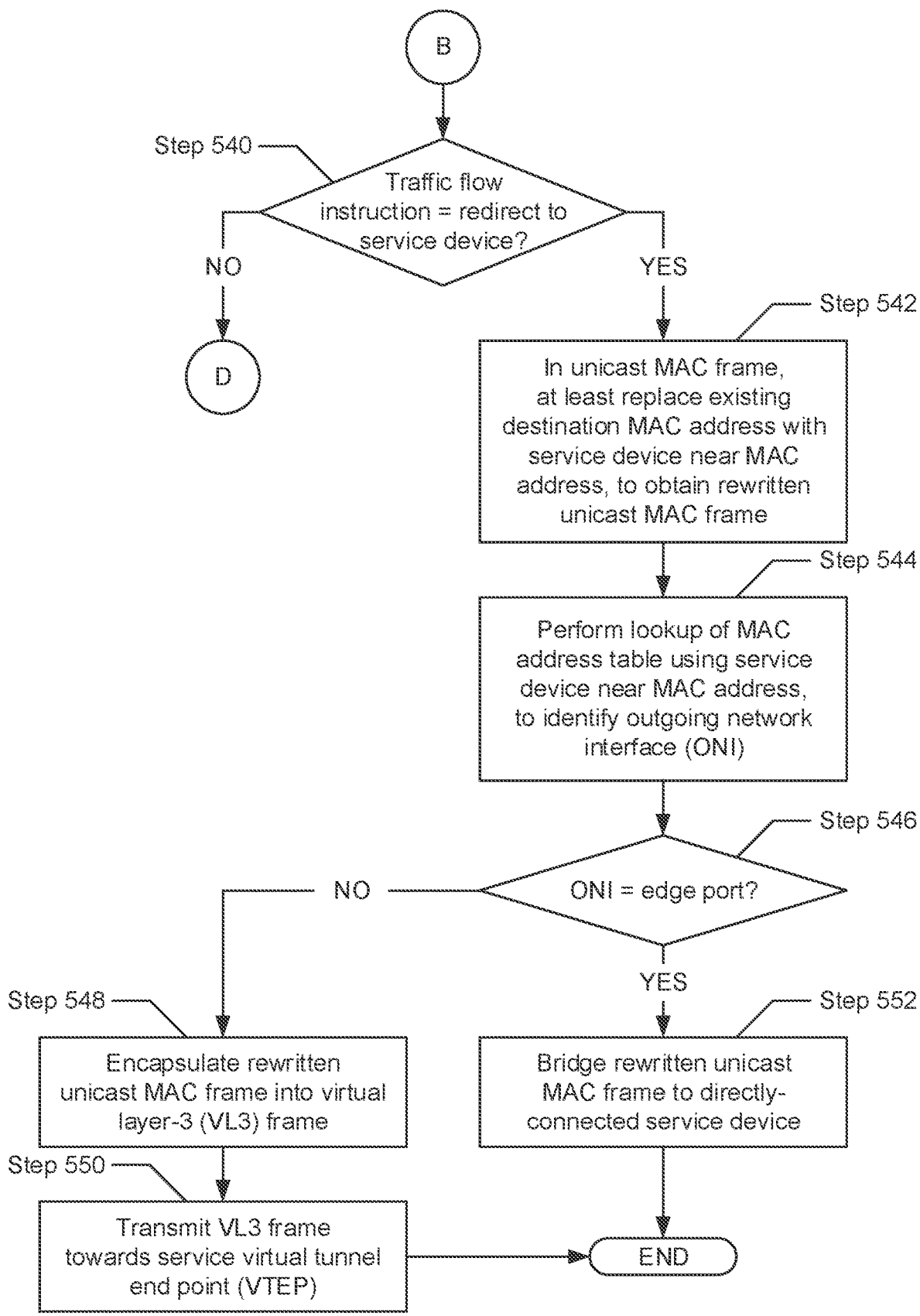

FIGS. 5A-5C show flowcharts describing a method for directing network traffic flow in accordance with one or more embodiments of the invention. The various steps outlined below may be performed by any network element or a virtual tunnel end point (VTEP) that may be executing on the network element. Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a unicast media access control (MAC) frame is received at an incoming network interface (INI). In one embodiment of the invention, the unicast MAC frame may have been generated and transmitted by, and thus, may have originated from, a source host or a source virtual machine executing on the source host. The source host may be directly-connected to the network element and/or VTEP that may be performing the method depicted in FIGS. 5A-5C. Further, the INI may represent an inbound physical or virtual network interface that may be directly-connected to an outbound physical or virtual network interface of the source host.

In Step 502, a determination is made as to whether the INI (at which the unicast MAC frame is received in Step 500) is an edge port. An edge port may refer to an inbound or outbound network interface that may be directly-connected to a leaf device on the network. Examples of leaf devices include, but are not limited to, hosts, service devices, and control plane services (CPSs). In contrast, spine or core devices on the network, which may be directly-connected to spine or core ports, may include, for example, other network elements. Further, in one embodiment of the invention, determining whether the INI is an edge port may entail accessing configuration metadata associated with the INI, which may include information describing the port type of the INI. In another embodiment of the invention, determining whether the INI is an edge port may entail examining whether the received unicast MAC frame arrived encapsulated in a virtual layer-3 (VL3) frame or arrived un-encapsulated. In such an embodiment, the determination of whether the INI is an edge port may be contingent on two assumptions: (1) all un-encapsulated network traffic received at an INI is assumed to have been last sent from a leaf device and, therefore, the INI is an edge port; and (2) all encapsulated network traffic (e.g., VXLAN encapsulated network traffic) is assumed to have been last sent from a core or spine network element and, therefore, the INI is not an edge port. Subsequently, in one embodiment of the invention, if it is determined that the INI is an edge port, then the process may proceed to Step 506. On the other hand, in another embodiment of the invention, if it is alternatively determined that the INI is a spine or core port, then the process may alternatively proceed to Step 504.

In Step 504, after determining (in Step 502) that the INI (at which the unicast MAC frame is received in Step 500) is a spine or core port, the unicast MAC frame is transmitted towards a destination host or destination virtual machine (i.e., identified in layer-2 (L2) and/or layer-3 (L3) header information specified in the unicast MAC frame) using conventional routing and/or bridging. Specifically, in one embodiment of the invention, if the destination host is a directly-connected host, the unicast MAC frame may be bridged over to the destination host through an appropriate outgoing network interface (ONI). Alternatively, in another embodiment of the invention, if the destination host is a remote host, the unicast MAC frame may be encapsulated in a virtual L3 (VL3) frame (e.g., a virtual extensible local area network (VXLAN) frame), which may be transmitted towards a remote VTEP behind which the destination host may reside. Moreover, in one embodiment of the invention, the transmission of the unicast MAC frame using conventional routing and/or bridging may entail forwarding the unicast MAC frame along a path that bypasses any service device.

In Step 506, after alternatively determining (in Step 502) that the INI (at which the unicast MAC frame is received in Step 500) is an edge port, the unicast MAC frame is examined. In one embodiment of the invention, examination of the unicast MAC frame may result in the obtaining of one or more source L2, L3, and/or layer-4 (L4) data, as well as one or more destination L2, L3, and/or L4 data. Source L2, L3, and/or L4 data may refer to data link layer, network layer, and/or transport layer information, respectively, pertinent to the source host or virtual machine, whereas destination L2, L3, and/or L4 data refers to similar information pertinent to the destination host or virtual machine. Examples of source and destination L2, L3, and/or L4 data include, but are not limited to, source and destination MAC addresses, source and destination Internet Protocol (IP) addresses, and source and destination port numbers, respectively.

In Step 508, a lookup is performed on a group table (see e.g., FIGS. 2C and 2D) using the source L2, L3, and/or L4 data (obtained in Step 506). In one embodiment of the invention, the particular source L2, L3, and/or L4 data used for the lookup may be based on search information—i.e., the search or lookup key—appropriate to the group table. By way of an example, if the group table stores bindings relating L2 information to a group assignment, then the search or lookup key may include only the necessary source L2 data (e.g., a source MAC address). Further, based on the lookup, a source group may be identified, where the source group refers to a group assignment into which the source L2, L3, and/or L4 data has been classified.

In Step 510, another lookup is performed on a group table (see e.g., FIGS. 2C and 2D) using the destination L2, L3, and/or L4 data (obtained in Step 506). In one embodiment of the invention, the particular destination L2, L3, and/or L4 data used for the lookup may be based on search information—i.e., the search or lookup key—appropriate to the group table. By way of an example, if the group table stores bindings relating L3 information to a group assignment, then the search or lookup key may include only the necessary destination L3 data (e.g., a destination IP address). Further, based on the lookup, a destination group may be identified, where the destination group refers to a group assignment into which the destination L2, L3, and/or L4 data has been classified.

In Step 512, a first ternary content addressable memory (TCAM) key is generated using at least the source group (identified in Step 508) and/or the destination group (identified in Step 510). In one embodiment of the invention, the first TCAM key may be a sequence or pattern of bits formed from the concatenation of various binary-formatted pieces of information (i.e., data items) including the source group and/or the destination group. By way of an example, consider a TCAM value pattern (see e.g., FIG. 2F) concatenating the following six data items in the following order: (i) a source IP address associated with a source host (occupying up to 32 bits); (ii) a destination IP address associated with a destination host (occupying up to 32 bits); (iii) a source MAC address associated with the source host (occupying up to 48 bits); (iv) a destination MAC address associated with the destination host (occupying up to 48 bits); (v) a source group to which the source host is assigned (occupying up to 4 bits); and (vi) a destination group to which the destination host is assigned (occupying up to 4 bits). Subsequently, based on the aforementioned TCAM value pattern, the first TCAM key may entail a sequence of 168 bits where: the first 160 bits are each set as a "do not care" (i.e., binary value X) bit; the next 4 bits representative of the source group is set to the binary form of the numeric or categorical value of the source group; and the last 4 bits representative of the destination group is set to the binary form of the numeric or categorical value of the destination group.

Turning to FIG. 5B, in Step 520, a lookup is performed on a TCAM (see e.g., FIG. 2E) using the first TCAM key (generated in Step 512). In one embodiment of the invention, the lookup may result in the identification of zero or more slice entries (i.e., a first set of slice entries) across the one or more feature TCAM slices of the TCAM. Further, for every slice entry that may be identified, the first TCAM key overlaid with the pattern mask (specified in the slice entry) may match the value pattern overlaid with the pattern mask (both specified in the slice entry).

In Step 522, a second TCAM key is generated using at least one or more source L2, L3, and/or L4 data (obtained in Step 506) and/or destination L2, L3, and/or L4 data (also obtained in Step 506). In one embodiment of the invention, the second TCAM key may be a sequence or pattern of bits formed from the concatenation of various binary-formatted pieces of information (i.e., data items) including the one or more source L2, L3, and/or L4 data and/or the one or more destination L2, L3, and/or L4 data. By way of an example, consider a TCAM value pattern (see e.g., FIG. 2F) concatenating the following six data items in the following order: (i) a source IP address associated with a source host (occupying up to 32 bits); (ii) a destination IP address associated with a destination host (occupying up to 32 bits); (iii) a source MAC address associated with the source host (occupying up to 48 bits); (iv) a destination MAC address associated with the destination host (occupying up to 48 bits); (v) a source group to which the source host is assigned (occupying up to 4 bits); and (vi) a destination group to which the destination host is assigned (occupying up to 4 bits). Subsequently, based on the aforementioned TCAM value pattern, the second TCAM key (which, for the purposes of this example, is generated using the source and destination MAC addresses as the source and destination L2, L3, and/or L4 data, respectively) may entail a sequence of 168 bits where: the first 64 bits are each set as a "do not care" (i.e., binary value X) bit; the next 48 bits representative of the source MAC address is set to the binary form of the source MAC address; the following 48 bits thereafter representative of the destination MAC address is set to the binary form of the destination MAC address; and the last 8 bits are also each set as a "do not care" (i.e., binary value X) bit.

In Step 524, another lookup is performed on the TCAM (see e.g., FIG. 2E) using the second TCAM key (generated in Step 522). In one embodiment of the invention, the lookup may result in the identification of zero or more slice entries (i.e., a second set of slice entries) across the one or more feature TCAM slices of the TCAM. Further, for every slice entry that may be identified, the second TCAM key overlaid with the pattern mask (specified in the slice entry) may match the value pattern overlaid with the pattern mask (both specified in the slice entry).

In Step 526, a determination is made as to whether a superset, including a union of the first set of slices (identified in Step 520) and the second set of slices (identified in Step 522), is an empty. That is, a determination is made as to whether no or zero slice entries of the TCAM had been identified based on lookups using the first and second TCAM keys (generated in Steps 512 and 522, respectively). In one embodiment of the invention, if it is determined that the aforementioned superset is an empty set, then the process may proceed to Step 504 (see e.g., FIG. 5A), where the unicast MAC frame (received in Step 500) may be transmitted towards a destination host or destination virtual machine (i.e., identified in L2 and/or L3 header information specified in the unicast MAC frame) using conventional routing and/or bridging. On the other hand, in another embodiment of the invention, if it is alternatively determined that the aforementioned superset identifies at least one slice entry of the TCAM, then the process may alternatively proceed to Step 528.

In Step 528, after determining (in Step 526) that the above-mentioned superset of slice entries includes at least one identified slice entry of the TCAM, a priority slice entry is selected from the superset. In one embodiment of the invention, the priority slice entry may be selected based on the priority level specified in each slice entry identified in the superset of slice entries. The priority level may be a numeric or categorical value representing the relative importance of the service policy (see e.g., FIG. 2A), priority policy (see e.g., FIG. 2B), or any other policy, with which the slice entry may be associated. In one embodiment of the invention, the selected priority slice entry may be identified as the slice entry with the highest priority level specified therein. In embodiments where two or more slice entries each specify a same highest priority level across the superset, the selected priority slice entry may be identified as the slice entry allocated in the feature TCAM slice designated to the highest ranking feature configured on the network element.

In Step 530, from the priority slice entry (selected in Step 528), one or more traffic flow instructions specified therein are obtained. In one embodiment of the invention, the traffic flow instruction(s) may refer to one or more actions that are to be applied to the unicast MAC frame (received in Step 500) (e.g., representing an instance of a defined network traffic flow). The action(s) may impact the propagation of the unicast MAC frame towards arriving at its intended termination end point (i.e., the destination host or virtual machine).

Turning to FIG. 5C, in Step 540, a determination is made as to whether the traffic flow instruction(s) (obtained in Step 530) specify the interception and subsequent redirection of the defined network traffic flow to a service device. In one embodiment of the invention, if it is determined that the traffic flow instruction(s) outline redirection of the defined network traffic flow (i.e., specifies a redirecting action), then the process may proceed to Step 542. Further, in such an embodiment, the traffic flow instruction(s) may take form as a next hop instruction that specifies an IP address associated with a service device near network interface. The near network interface of a service device may refer to an inbound network interface of the service device designated for receiving network traffic identified as requiring inspection by the service device. In another embodiment of the invention, if it is alternatively determined that the traffic flow instruction(s) specify instructions other than the redirection of the defined network traffic flow to a service device, then the process may alternatively proceed to Step 560 (see e.g., FIG. 5A).

Turning briefly back to FIG. 5A, in Step 560, after determining (in Step 540) that the traffic flow instruction(s) (obtained in Step 530) specify instructions other than the redirection of the defined network traffic flow to a service device, a determination is made as to whether the network traffic flow instruction(s) alternatively specify bypassing any service devices. In one embodiment of the invention, if it is determined that the traffic flow instruction(s) outline bypassing any service devices (i.e., a bypassing action), then the process may proceed to Step 504. Further, in such an embodiment, bypassing any service devices may entail forwarding the unicast MAC frame (received in Step 500) towards a destination host or destination virtual machine (i.e., identified in the L2 and/or L3 header information specified in the unicast MAC frame) using conventional routing and/or bridging. On the other hand, if it is alternatively determined that the traffic flow instruction(s) specify a discarding action, then the process may alternatively proceed to Step 562. In Step 562, after determining (in Step 560) that the traffic flow instruction(s) (obtained in Step 530) specify a discarding action, the unicast MAC frame (received in Step 500) is dropped.

Returning to FIG. 5C, in Step 542, after determining (in Step 540) that the traffic flow instruction(s) (obtained in Step 530) specify the interception and subsequent redirection of the defined network traffic flow to a service device (i.e., a redirecting action), the unicast MAC frame (received in Step 500) is rewritten. Specifically, in one embodiment of the invention, rewriting the unicast MAC frame may entail at least replacing the existing destination MAC address (specified in the L2 header information of the unicast MAC frame) with a service device near MAC address associated with the near network interface of a service device. As mentioned above, the traffic flow instruction(s) may take form as a next hop instruction that specifies an IP address associated with a service device near network interface. The corresponding service device near MAC address may be obtained based on a lookup performed on an address resolution protocol (ARP) table (see e.g., FIG. 2G) using the aforementioned IP address associated with the service device near network interface. Further, in rewriting the unicast MAC frame, a resulting rewritten unicast MAC frame may be obtained.

In Step 544, a lookup is performed on a MAC address table (see e.g., FIG. 2H) using the service device near MAC address. In one embodiment of the invention, the MAC address table may represent a data object or structure that stores bindings relating data link layer (i.e., L2) information to transport layer (i.e., L4) information, or more specifically, MAC addresses to outbound port numbers. Subsequently, the lookup may result in the identification of an outgoing network interface (ONI) through which the near network interface of the service device, either directly or indirectly, may be reached. The ONI may refer to an outbound physical or virtual network interface on the network element (directly-connected to the source host).

In Step 546, a determination is made as to whether the ONI (identified in Step 544) is an edge port. An edge port may refer to an inbound or outbound network interface that may be directly-connected to a leaf device on the network. Examples of leaf devices include, but are not limited to, hosts, service devices, and control plane services (CPSs). In contrast, spine or core devices on the network, which may be directly-connected to spine or core ports, may include, for example, other network elements. Further, determining whether the ONI is an edge port may entail accessing configuration metadata associated with the ONI, which may include information describing the port type of the ONI. Subsequently, in one embodiment of the invention, if it is determined that the ONI is an edge port, then the process may proceed to Step 552. On the other hand, in another embodiment of the invention, if it is alternatively determined that the ONI is a spine or core port, then the process may alternatively proceed to Step 548.

In Step 548, after determining (in Step 546) that the ONI (identified in Step 544) is a spine or core port, the rewritten unicast MAC frame (obtained in Step 542) is encapsulated. Specifically, in one embodiment of the invention, the rewritten unicast MAC frame may be encapsulated in a virtual L3 (VL3) frame (e.g., a VXLAN frame). Thereafter, in Step 550, the obtained VL3 frame is subsequently transmitted, through the L3 fabric (see e.g., FIG. 1), towards a service VTEP behind which the service device may reside.

In Step 552, after alternatively determining (in Step 546) that the ONI (identified in Step 544) is an edge port, the rewritten unicast MAC frame (obtained in Step 542) is bridged. Specifically, in one embodiment of the invention, the rewritten unicast MAC frame may be bridged, through the ONI, to arrive at a directly-connected service device.

FIGS. 6A-7D show various aspects of an example in accordance with one or more embodiments of the invention. The following example, presented in conjunction with components shown in FIGS. 6A-7D, are for explanatory purposes only and not intended to limit the scope of the invention.

Figure 6A:
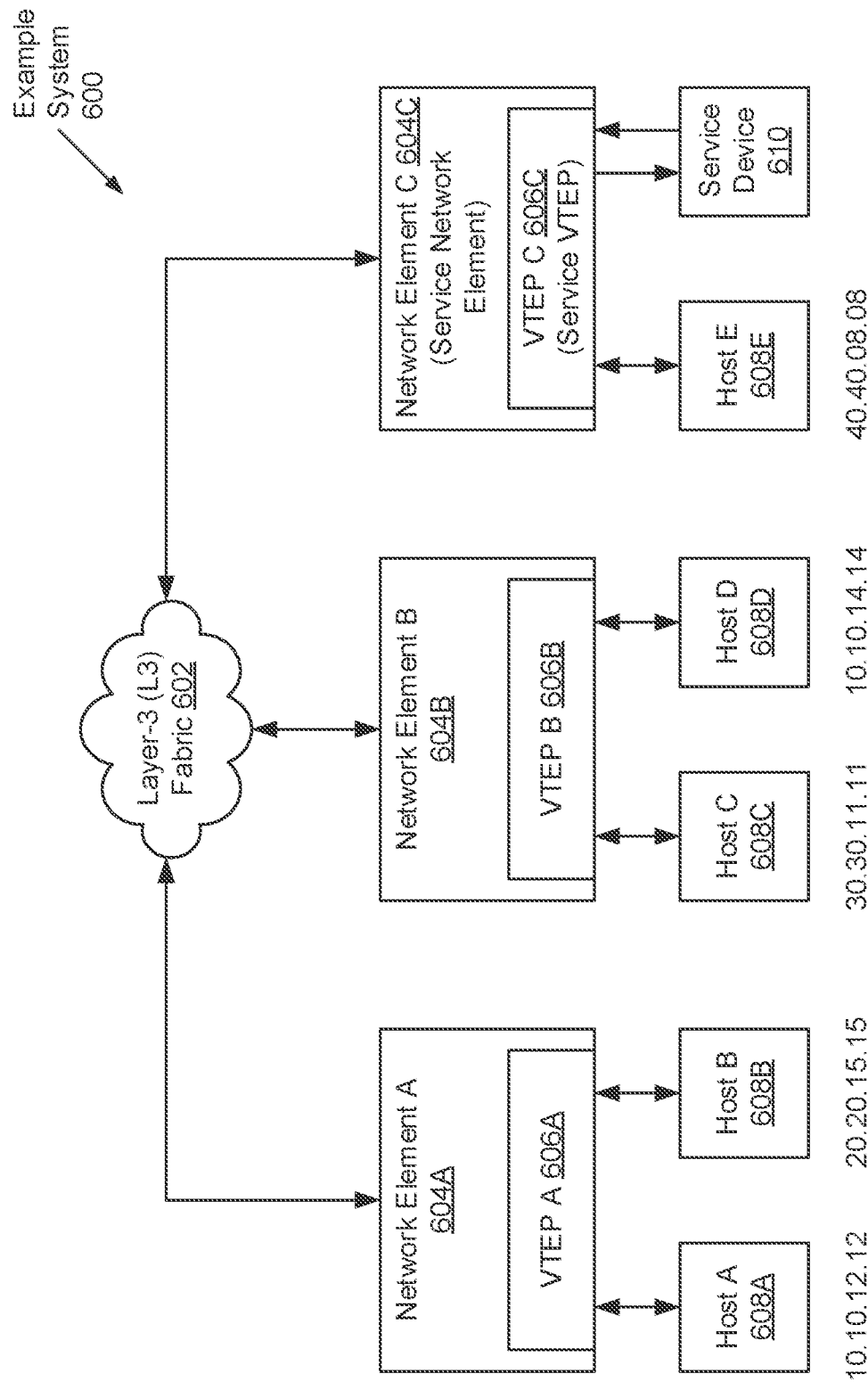
FIG. 6A shows an example system in accordance with one or more embodiments of the invention.

For context surrounding the example, an example system (600) is illustrated in FIG. 6A. The example system (600) includes three network elements (604A-604C) operatively connected to one another through a layer-3 (L3) fabric (602). Further, a respective virtual tunnel end point (VTEP) (606A-606C) is executing on each of the three network elements (604A-604C). Each network element (604A-604C) is also directly-connected to at least one host (608A-608E). Specifically, a first network element (604A) is directly-connected to first and second hosts (608A, 608B); a second network element (604B) is directly-connected to third and fourth hosts (608C, 608D); and a third network element (604C) is directly-connected to a fifth host (608E). Example IP addresses for the five hosts (608A-608E) are portrayed as well—i.e., 10.10.12.12 for the first host (608A), 20.20.15.15 for the second host (608B), 30.30.11.11 for the third host (608C), 10.10.14.14 for the fourth host (608D), and 40.40.08.08 for fifth host (608E). The example system (600) further includes a service device (610), which is directly-connected to the third network element (604C). Moreover, the third network element (604C) is a service network element, whereas the respective VTEP (606C) executing on the third network element (604C) is a service VTEP.

Figure 6B:
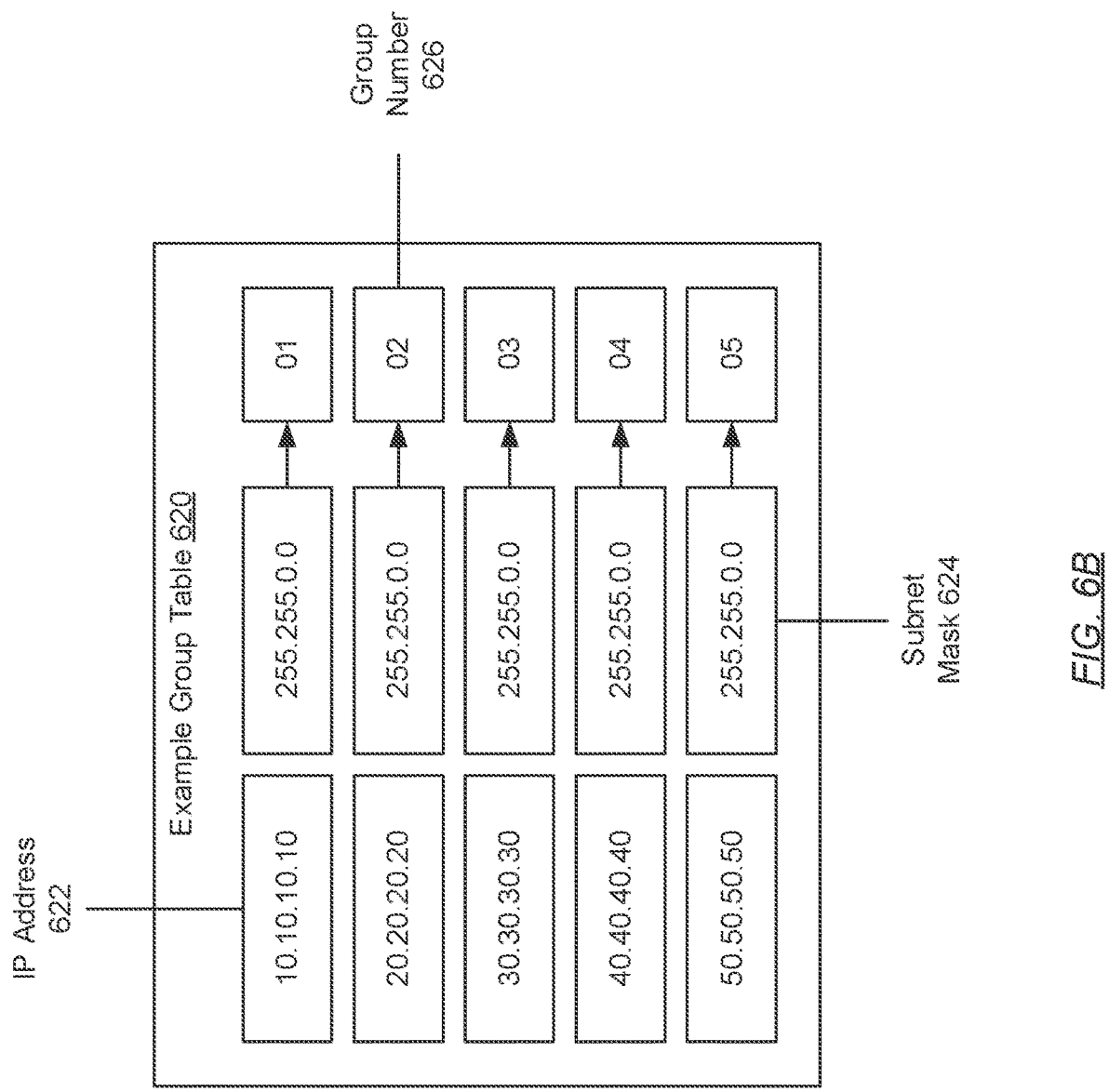
FIG. 6B shows an example group table in accordance with one or more embodiments of the invention.

For further context surrounding the example, an example group table (620) is portrayed in FIG. 6B. The example group table (620) stores several bindings relating IP information to group assignments. Specifically, the example group table (620) includes five example bindings. Each binding (or group table entry) maps an IP address (622) and a subnet mask (624) to a group number (626). Further, in overlaying the subnet mask (624) over the IP address (622), each binding may, more specifically, map a subnetwork to a group number (626). For example, the first binding maps the 10.10.X.X subnet to group 01.

Figure 6C:
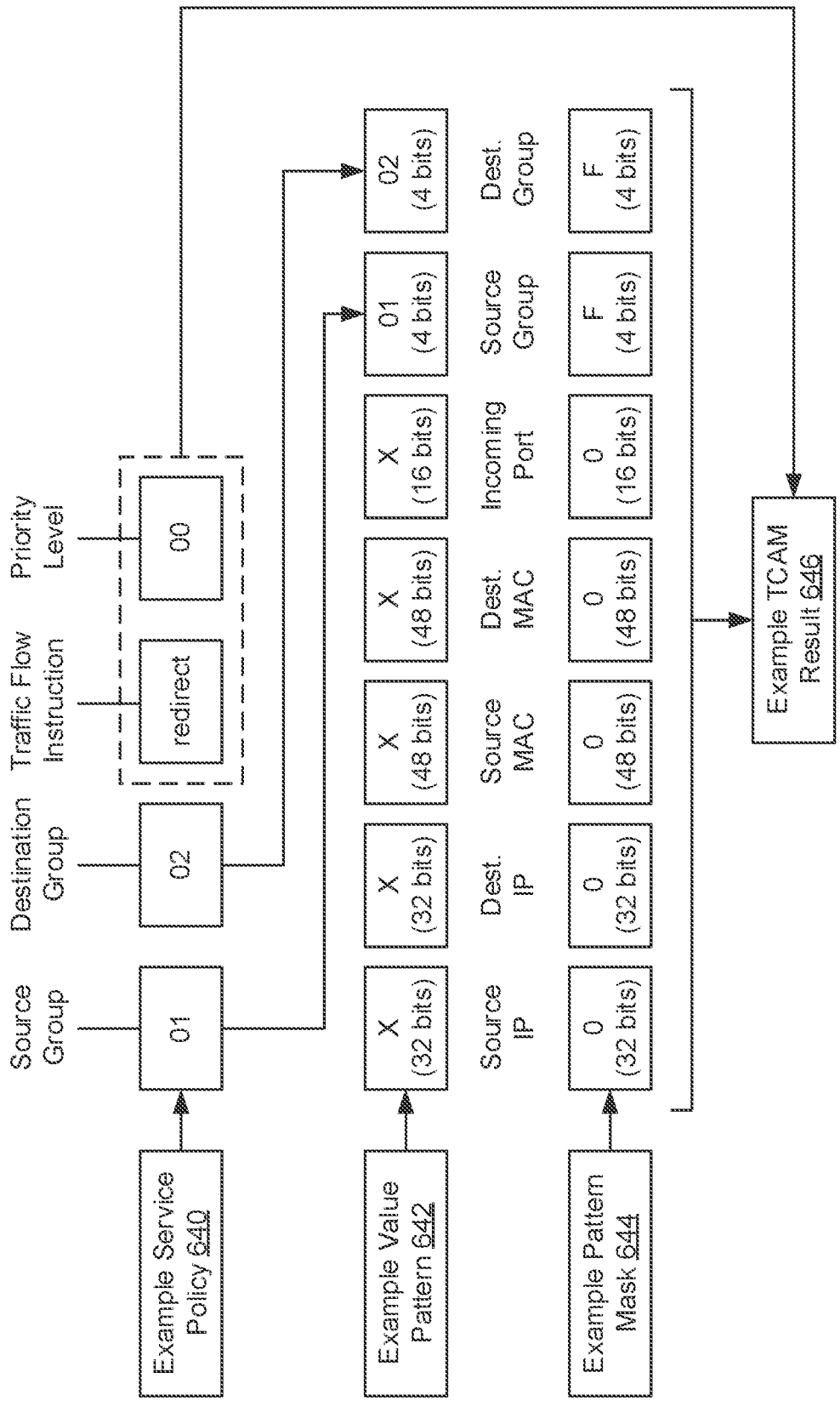
FIG. 6C shows an example service policy in accordance with one or more embodiments of the invention.

FIG. 6C shows an example service policy in accordance with one or more embodiments of the invention. More specifically, incorporation of the example service policy (640) into a TCAM of any of the three network elements (604A-604C) of the example system (600) is diagrammed. Foremost, as described above, the example service policy (640) may be received from a control plane service CPS) (not shown in the example system (600)). Further, the example service policy (640) includes a source group (i.e., group 01), a destination group (i.e., group 02), a traffic flow instruction (i.e., a redirecting action), and a priority level (i.e., level 00).

Upon receiving the example service policy (640), an example value pattern (642) is generated using at least the source group and destination group specified in the example service policy (640). The example value pattern (642) is a sequence or pattern of bits formed from the concatenation of multiple binary-formatted data items. These data items include, in the following order: (i) a source IP address associated with a source host (occupying up to 32 bits); (ii) a destination IP address associated with a destination host (occupying up to 32 bits); (iii) a source MAC address associated with the source host (occupying up to 48 bits); (iv) a destination MAC address associated with the destination host (occupying up to 48 bits); (v) an incoming port number identifying a physical or virtual network interface of a network element (604A-604C) through which network traffic from the source host may be received (occupying up to 16 bits); (vi) a source group to which the source host is assigned (occupying up to 4 bits); and (vii) a destination group to which the destination host is assigned (occupying up to 4 bits).

Subsequently, the example value pattern (642) generated using at least the source group (i.e., group 01) and destination group (i.e., group 02) would be a 184 bit array, where: the first 176 bits are set as "do not care" (i.e., defined as bit value X) bits; the next 4 bits representative of the source group are set to 0001 (i.e., binary form of numeric value 01); and the last 4 bits representative of the destination group are set to 0010 (i.e., binary form of numeric value 02). Hereinafter, an example pattern mask (644) is generated based on the bit locations of the source and destination groups along the example value pattern (642). Specifically, the example pattern mask (644) represents a bitmask expressed in the same binary format and bit order as the example value pattern (642), which highlights the value pattern bits of interest or significance to the example service policy (640). In the instant case, all bits at bit locations designated for source and destination groups are set (i.e., defined as binary value one) while the remaining bits, representative of the other data items, are left clear (i.e., defined as binary value zero). After generation, the example pattern mask (644) would encompass a 184 bit array, where: the first 176 bits are retained as binary zeroes; the next 4 bits representative of the source group are set to binary ones (i.e., 1111 or hexadecimal value F); and the last 4 bits representative of the destination group are set to binary ones (i.e., 1111 or hexadecimal value F).

Following generation of the example pattern mask (644), a TCAM is updated to incorporate the example service policy (640). Specifically, a new slice entry in the feature TCAM slice (see e.g., FIG. 2E) designated for control plane policies is allocated, where the new slice entry stores a binding relating the example value pattern (642) and the example pattern mask (644) to an example TCAM result (646). Further, the example TCAM result (646) is specified as the traffic flow instruction (i.e., a redirecting action) and the priority level (i.e., level 00) provided in the received example service policy (640).

Figure 6D:
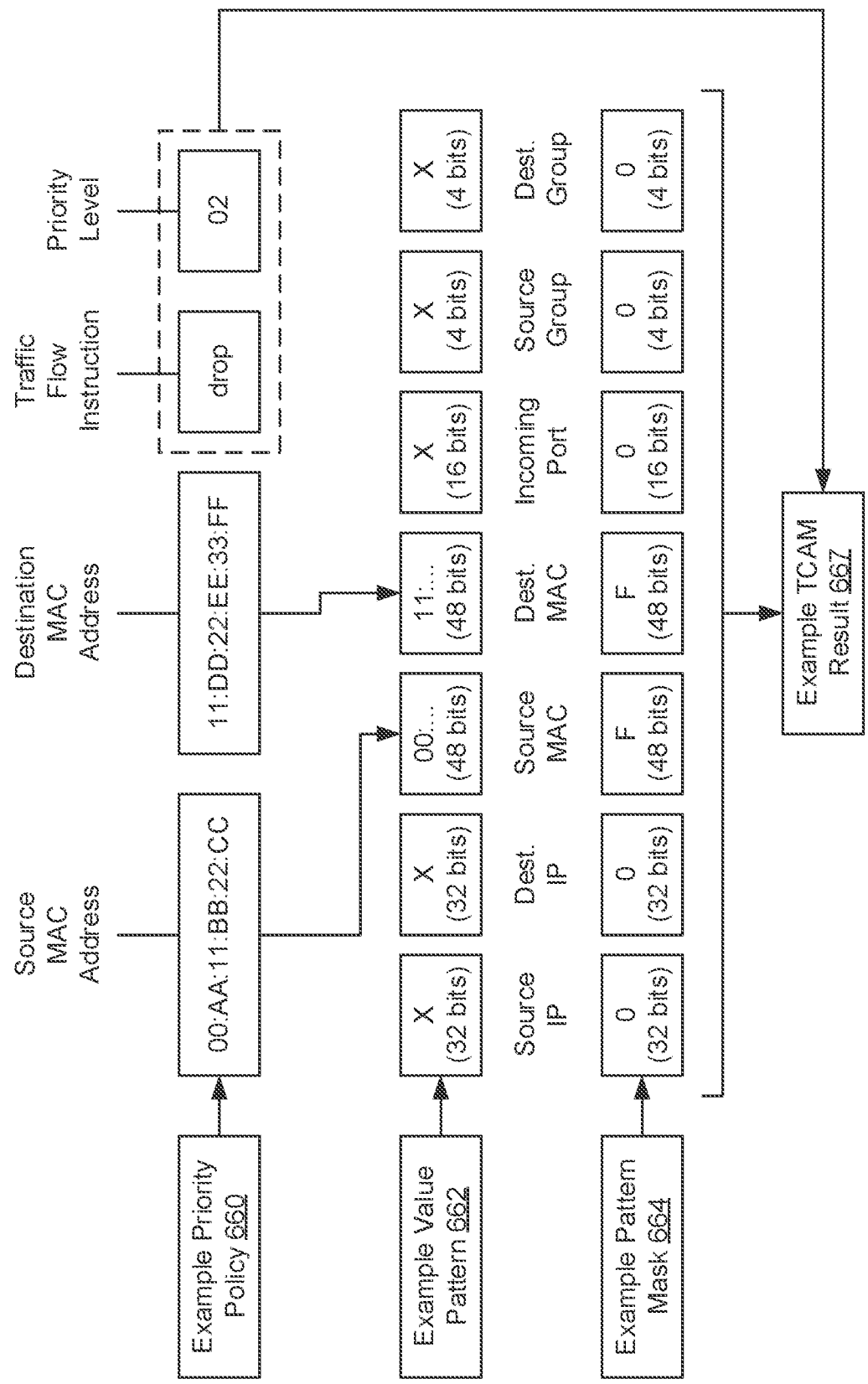
FIG. 6D shows an example priority policy in accordance with one or more embodiments of the invention.

FIG. 6D shows an example priority policy in accordance with one or more embodiments of the invention. More specifically, incorporation of the example priority policy (660) into a TCAM of any of the three network elements (604A-604C) of the example system (600) is diagrammed. Foremost, as described above, the example priority policy (660) may be received from a control plane service CPS) (not shown in the example system (600)). Further, the example priority policy (660) includes a source MAC address (i.e., 00:AA:11:BB:22:CC) associated with a source host, a destination MAC address (i.e., 11:DD:22:EE:33:FF) associated with a destination host, a traffic flow instruction (i.e., a discarding action), and a priority level (i.e., level 02).

Upon receiving the example priority policy (660), an example value pattern (662) is generated using at least the source MAC address and destination MAC address specified in the example priority policy (660). The example value pattern (662) is a sequence or pattern of bits formed from the concatenation of multiple binary-formatted data items. These data items include, in the following order: (i) a source IP address associated with a source host (occupying up to 32 bits); (ii) a destination IP address associated with a destination host (occupying up to 32 bits); (iii) a source MAC address associated with the source host (occupying up to 48 bits); (iv) a destination MAC address associated with the destination host (occupying up to 48 bits); (v) an incoming port number identifying a physical or virtual network interface of a network element (604A-604C) through which network traffic from the source host may be received (occupying up to 16 bits); (vi) a source group to which the source host is assigned (occupying up to 4 bits); and (vii) a destination group to which the destination host is assigned (occupying up to 4 bits).

Subsequently, the example value pattern (662) generated using at least the source MAC address (i.e., 00:AA:11:BB:22:CC) and destination MAC address (i.e., 11:DD:22:EE:33:FF) would be a 184 bit array, where: the first 64 bits are set as "do not care" (i.e., defined as bit value X) bits; the next 48 bits representative of the source MAC address are set to 0000 0000 1010 1010 0001 0001 1011 1011 0010 0010 1100 1100 (i.e., binary form of the source MAC address); the following 48 bits thereafter representative of the destination MAC address are set to 0001 0001 1101 1101 0010 0010 1110 1110 0011 0011 1111 1111 (i.e., binary form of the destination MAC address); and the last 24 bits are set as "do not care" (i.e., defined as bit value X) bits. Hereinafter, an example pattern mask (664) is generated based on the bit locations of the source and destination MAC addresses along the example value pattern (662). Specifically, the example pattern mask (664) represents a bitmask expressed in the same binary format and bit order as the example value pattern (662), which highlights the value pattern bits of interest or significance to the example priority policy (660). In the instant case, all bits at bit locations designated for source and destination MAC addresses are set (i.e., defined as binary value one) while the remaining bits, representative of the other data items, are left clear (i.e., defined as binary value zero). After generation, the example pattern mask (664) would encompass a 184 bit array, where: the first 64 bits are retained as binary zeroes; the next 48 bits representative of the source MAC address are set to binary ones; the following 48 bits thereafter representative of the destination MAC address are set to binary ones; and the last 24 bits are retained as binary zeroes.

Following generation of the example pattern mask (664), a TCAM is updated to incorporate the example priority policy (660). Specifically, a new slice entry in the feature TCAM slice (see e.g., FIG. 2E) designated for control plane policies is allocated, where the new slice entry stores a binding relating the example value pattern (662) and the example pattern mask (664) to an example TCAM result (667). Further, the example TCAM result (667) is specified as the traffic flow instruction (i.e., a discarding action) and the priority level (i.e., level 02) provided in the received example priority policy (660).

Figure 6E:
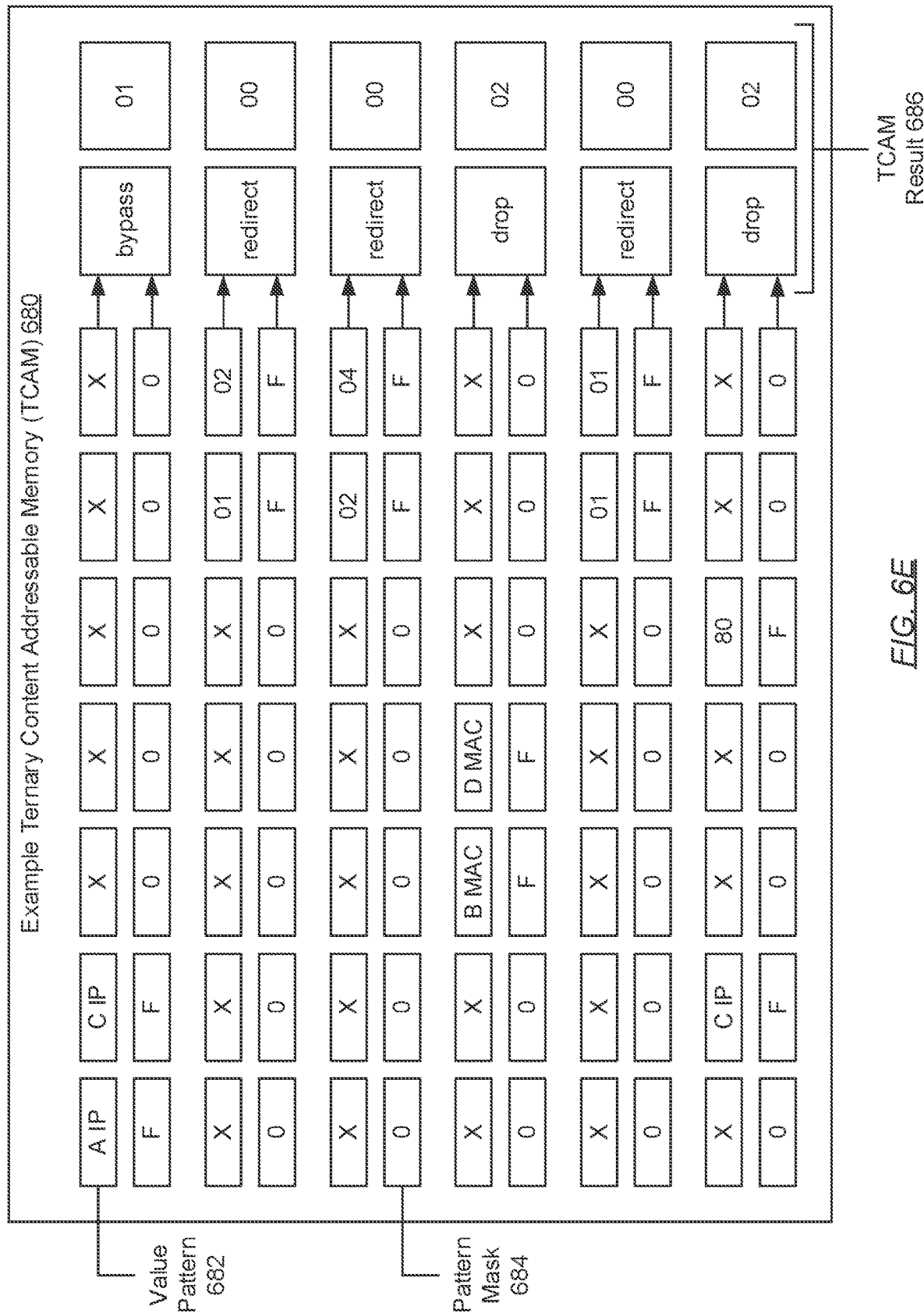
FIG. 6E shows an example ternary content addressable memory in accordance with one or more embodiments of the invention.

For additional context surrounding the example, an example TCAM (680) is portrayed in FIG. 6E. The example TCAM (680) stores several bindings relating value pattern and pattern mask pairs to TCAM results. Specifically, the example TCAM (680) includes six example bindings. Each binding (or slice entry) maps value pattern (682) and a pattern mask (684) to a TCAM result (686), where the TCAM result (686) encompasses a traffic flow instruction (e.g., a redirecting action, a bypassing action, or a discarding action) and a priority level (e.g., level 00, 01, or 02). Further, in overlaying the pattern mask (684) over the value pattern (682), each binding may, more specifically, entail a particular sequence of bits, which must be matched by a TCAM key during a lookup operation, to obtain the corresponding TCAM result (686). For example, the first binding maps a concatenation of 184 bits collectively representing seven different data items (listed above in FIGS. 6C and 6D)—i.e., the first 32 bits occupied by the binary form of the IP address for the first host (608A); the second 32 bits occupied by the binary form of the IP address for the third host (608C); and the remaining 120 bits each occupied by the binary value zero—to a bypassing action (as the traffic flow instruction) and level 01 (indicating the priority level).

Figure 7A:
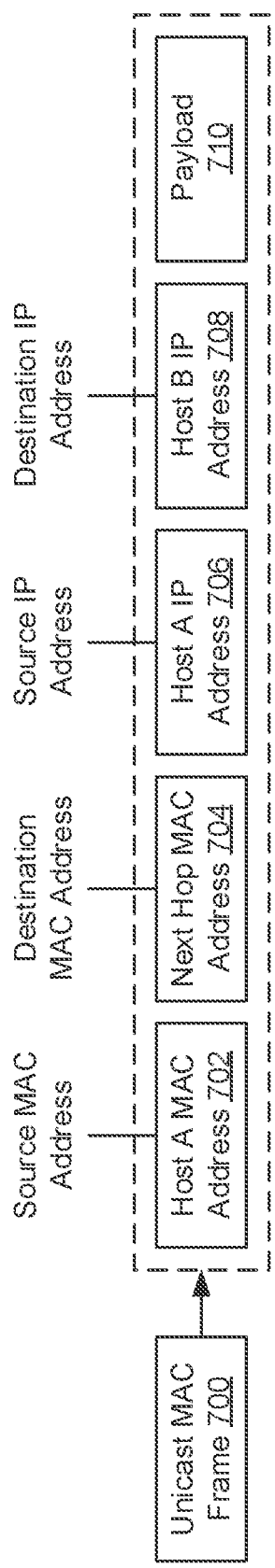
FIG. 7A shows an example unicast media access control frame in accordance with one or more embodiments of the invention.

For the example, consider a scenario whereby the first host (i.e., host A (608A)) generates network traffic (i.e., a unicast MAC frame) that designates the second host (i.e., host B (608B)) as the destination. An example of the unicast MAC frame (700) generated by the first host (608A) is shown in FIG. 7A. The unicast MAC frame (700) substantively includes the first host MAC address (702) (as the source MAC address), a next hop MAC address (704) (as the destination MAC address), the first host IP address (706) (as the source IP address), the second host IP address (708) (as the destination IP address), and a payload (710).

After transmission by the first host (608A), the unicast MAC frame (700) arrives at the first network element (604A) with which the first host (608A) is directly-connected. Assume, also, that the unicast MAC frame (700) arrives at some incoming network interface (INI) (not shown) of the first network element (604A). Because the INI directly-connects to the first host (608A), the INI is determined to be an edge port. Further, based on the INI being an edge port, the unicast MAC frame (700) is subsequently examined to obtain a source data item and a destination data item that may be used, in conjunction with the example group table (see e.g., FIG. 6B), to identify the group assignments for the source host (i.e., the first host (608A)) and the destination host (i.e., the second host (608B)), respectively.

Figure 7B:
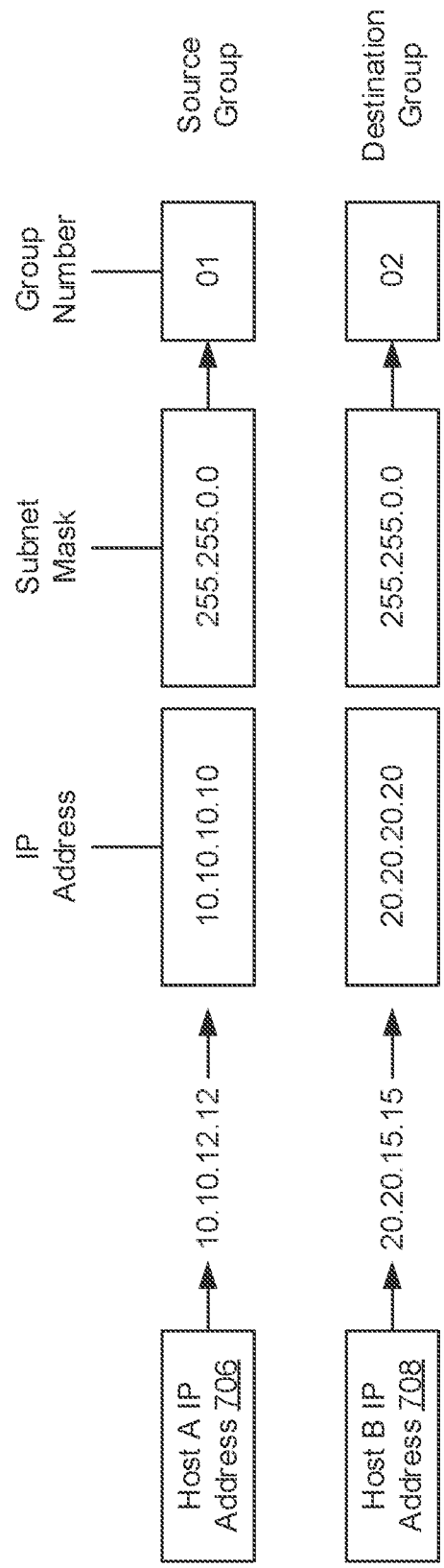
FIG. 7B shows an example group table lookup in accordance with one or more embodiments of the invention.
Figure 7C:
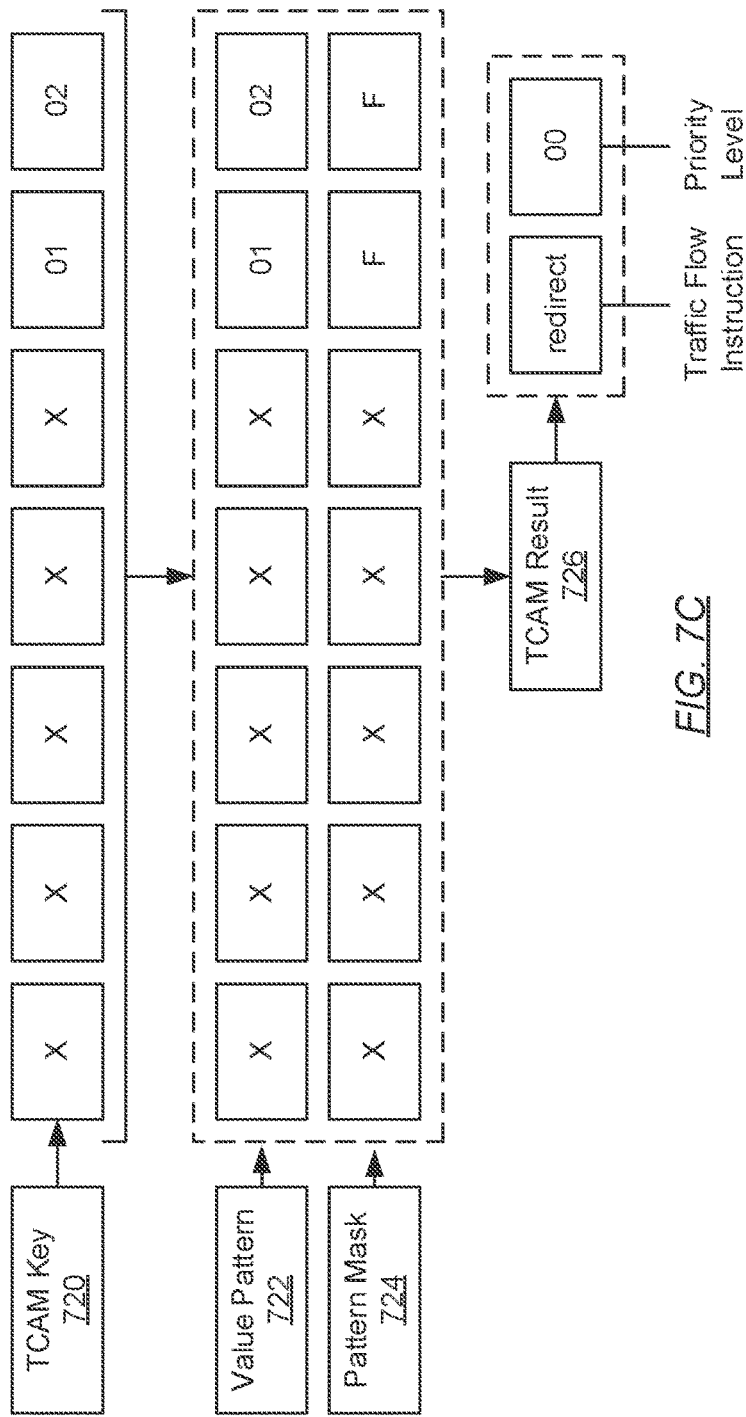
FIG. 7C shows an example ternary content addressable memory key and lookup in accordance with one or more embodiments of the invention.

FIG. 7B shows an example group table lookup to identify the above-mentioned group assignments for the source and destination hosts (608A, 608B). Specifically, from the unicast MAC frame (700), the first host IP address (706)—i.e., 10.10.12.12—is used as the source data item, whereas the second host IP address (708)—i.e., 20.20.15.15—is used as the destination data item. Next, the source and destination data items, separately, are used to perform lookups of the example group table (620). Based on the lookups: (i) a prefix match is obtained between the source data item and the IP address (622)-subnet mask (624) combination of the first binding, thus identifying the source group as group 01; and (ii) a prefix match is obtained between the destination data item and the IP address (622)-subnet mask (624) combination of the second binding, thus identifying the destination group as group 02.

Following the identification of the source and destination groups, an example TCAM key (720) (see e.g., FIG. 7C) is generated using at least the source and destination group numbers. Specifically, the generated TCAM key (720) may be a concatenation of 184 bits representative of seven data items (see e.g., FIGS. 6C and 6D), where: the first 176 bits are set as "do not care" (i.e., defined as bit value X) bits; the next 4 bits representative of the source group are set to 0001 (i.e., binary form of numeric value 01); and the last 4 bits representative of the destination group are set to 0010 (i.e., binary form of numeric value 02). The generated TCAM key (720) is subsequently used to perform a lookup on the example TCAM (680; see e.g., FIG. 6E). Based on the lookup, a match is obtained between the TCAM key (720) overlaid with the second binding pattern mask (724) and the second binding pattern value (722) overlaid with the second binding pattern mask (724), which results in the obtaining of the second binding TCAM result (726). The second binding TCAM result (726) specifies a redirecting action as the traffic flow instruction and level 00 as the priority level.

Figure 7D:
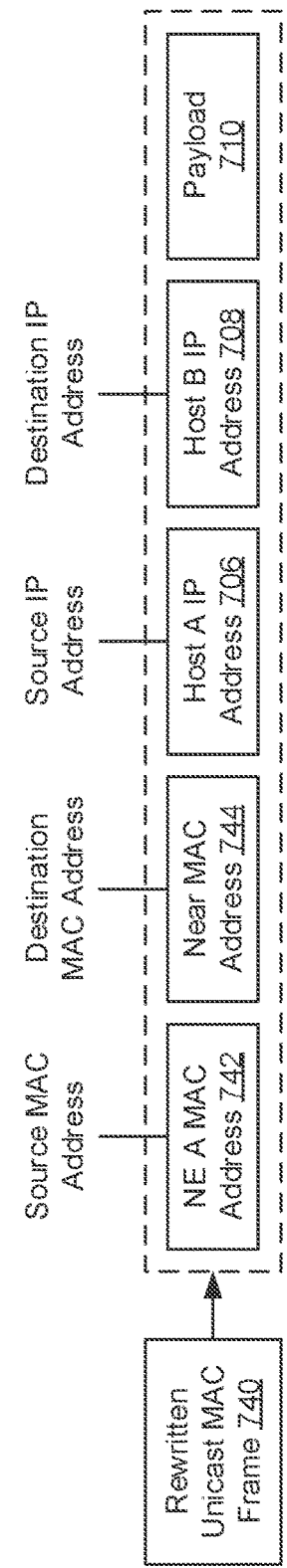
FIG. 7D shows an example rewritten unicast media access control frame in accordance with one or more embodiments of the invention.

Moreover, in accordance with the obtained traffic flow instruction (i.e., a redirecting action), the unicast MAC frame (700) is modified to obtain a rewritten unicast MAC frame (740) (see e.g., FIG. 7D). Specifically, the redirecting action specifies the interception and subsequent redirection of the unicast MAC frame (700) to the service device (610), which resides behind the third network element (604) in the example system (600) (see e.g., FIG. 6A). The obtained traffic flow instruction, though not shown, may also specify an IP address associated with the near network interface of the service device (610). By performing a lookup of an ARP table using the service device (610) near network interface IP address, a corresponding MAC address associated with the service device (610) near network interface (i.e., a near MAC address (744)) is identified. Furthermore, modification of the unicast MAC frame (700) to obtain the rewritten unicast MAC frame (740) may include at least: (i) replacing the existing source MAC address (i.e., the first host MAC address (702)) with the first network element MAC address (742); and (ii) replacing the existing destination MAC address (i.e., a next hop MAC address (704)) with the near MAC address (744). Afterwards, the rewritten unicast MAC frame (740) is transmitted towards the service device (610) via the L3 fabric (602) and the third network element (604C).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network traffic, comprising:
   receiving a media access control (MAC) frame at an incoming network interface;
   examining the MAC frame to identify source group data or destination group data corresponding to the MAC frame;
   generating a lookup key using based on the source group data or the destination group data obtained from the MAC frame;
   performing a lookup of a lookup table, using the lookup key, to identify a lookup table entry;
   obtaining a traffic flow instruction specified in the lookup table entry; and
   processing the MAC frame in accordance with the traffic flow instruction.

2. The method of claim 1, wherein the lookup table entry is selected from a plurality of lookup table entries identified by the lookup based on a priority level associated with the lookup table entry.

3. The method of claim 1, wherein the source group data or the destination group data is identified based on the lookup table.

4. The method of claim 3, wherein the source group data or the destination group data includes L2, L3 or L4 data.

5. The method of claim 4, wherein the lookup key comprises the L2, L3 or L4 data.

6. The method of claim 1, wherein the lookup key is a Ternary Content Addressable Memory (TCAM) key.

7. The method of claim 1, wherein the INI is an edge port of a network device.

8. The method of claim 1, wherein the lookup table is a group table.

9. The method of claim 1, wherein processing the MAC frame comprises replacing an existing destination MAC address with a next hop address.

10. The method of claim 1, wherein the next hop address is an address of a service device near network interface.

11. A network device, comprising:
    a processor;
    a plurality of network interfaces (INIs);
    a memory storing a lookup table; and
    a non-transitory computer readable medium, comprising instructions for:
      receiving a media access control (MAC) frame at a network interface;
      examining the MAC frame to identify source group data or destination group data corresponding to the MAC frame;
      generating a lookup key using based on the source group data or the destination group data obtained from the MAC frame;
      performing a lookup of the lookup table, using the lookup key, to identify a lookup table entry;
      obtaining a traffic flow instruction specified in the lookup table entry; and
      processing the MAC frame in accordance with the traffic flow instruction.

12. The network device of claim 11, wherein the lookup table entry is selected from a plurality of lookup table entries identified by the lookup based on a priority level associated with the lookup table entry.

13. The network device of claim 11, wherein the source group data or the destination group data is identified based on the lookup table.

14. The network device of claim 13, wherein the source group data or the destination group data includes L2, L3 or L4 data.

15. The network device of claim 14, wherein the lookup key comprises the L2, L3 or L4 data.

16. The network device of claim 11, wherein the memory is a Ternary Content Addressable Memory (TCAM).

17. The network device of claim 11, wherein the INI is an edge port of a network device.

18. The network device of claim 11, wherein the lookup table is a group table.

19. The network device of claim 11, wherein processing the MAC frame comprises replacing an existing destination MAC address with a next hop address.

20. The network device of claim 11, wherein the next hop address is an address of a service device near network interface.

* * * * *